US007305466B1

(12) United States Patent
Kaffine et al.

(10) Patent No.: US 7,305,466 B1
(45) Date of Patent: Dec. 4, 2007

(54) NETWORK FAULT ISOLATION

(75) Inventors: David M. Kaffine, Billerica, MA (US); Peter H. Schmidt, Lexington, MA (US); Joseph S. Rosen, Chicago, IL (US); Jonathan Wolf, Belmont, MA (US); Arthur Mellor, Arlington, MA (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 09/553,447

(22) Filed: Apr. 19, 2000

Related U.S. Application Data

(62) Division of application No. 09/322,107, filed on May 28, 1999.

(51) Int. Cl.
*G06F 15/173* (2006.01)
*G06F 13/10* (2006.01)
*G06F 11/00* (2006.01)
*G06F 15/16* (2006.01)
*G06F 9/44* (2006.01)

(52) U.S. Cl. ............... 709/224; 709/223; 709/236; 703/21; 703/22; 703/24; 714/4; 714/25; 714/28; 714/37

(58) Field of Classification Search ............... 709/223, 709/224, 201, 202, 236, 237; 703/13, 21, 703/22, 24; 714/25, 37, 38, 4, 28
See application file for complete search history.

(56) References Cited

U.S. PATENT DOCUMENTS

| 5,226,120 | A | * | 7/1993 | Brown et al. ............... 709/224 |
| 5,477,531 | A | | 12/1995 | McKee et al. ............... 370/17 |
| 5,666,481 | A | * | 9/1997 | Lewis ........................... 714/4 |
| 5,699,402 | A | * | 12/1997 | Bauer et al. ............ 379/29.09 |
| 5,732,268 | A | * | 3/1998 | Bizzarri ......................... 713/2 |
| 5,734,865 | A | * | 3/1998 | Yu ............................. 709/250 |
| 5,812,826 | A | * | 9/1998 | McLain, Jr. ................. 703/27 |
| 5,838,919 | A | | 11/1998 | Schwaller et al. ..... 395/200.54 |
| 5,881,051 | A | | 3/1999 | Arrowood et al. .......... 370/248 |
| 5,881,237 | A | | 3/1999 | Schwaller et al. ..... 395/200.54 |
| 5,894,566 | A | * | 4/1999 | Croslin ......................... 703/21 |

(Continued)

FOREIGN PATENT DOCUMENTS

EP 464014 A2 * 1/1992

(Continued)

OTHER PUBLICATIONS

IBM: "Strategy for Testing Distributed File Service" IBM Technical Disclosure Bulletin, Nov. 1, 1995, XP-002147035.*

(Continued)

*Primary Examiner*—Melvin H. Pollack
(74) *Attorney, Agent, or Firm*—Wolf, Greenfield & Sacks, P.C.

(57) ABSTRACT

Techniques are provided for improved fault isolation and fault reduction. A system for use with a data network includes multiple diagnostic units each adapted to communicate with the network including to a network user. A central controller is operatively connected to the diagnostic units, the controller being adapted to communicate with and coordinate operations of the diagnostic units, to instruct the diagnostic units to perform tests adapted to help isolate a network fault, and to analyze test results received from a diagnostic unit to attempt to determine the network fault. Various methods for improving fault isolation and fault reduction are also provided.

20 Claims, 15 Drawing Sheets

U.S. PATENT DOCUMENTS

| | | | | |
|---|---|---|---|---|
| 5,907,696 | A * | 5/1999 | Stilwell et al. | 703/13 |
| 5,937,165 | A | 8/1999 | Schwaller et al. | 395/200.54 |
| 5,964,891 | A * | 10/1999 | Caswell et al. | 714/31 |
| 6,012,152 | A * | 1/2000 | Douik et al. | 714/26 |
| 6,018,576 | A * | 1/2000 | Croslin | 379/22.03 |
| 6,031,528 | A * | 2/2000 | Langfahl, Jr. | 715/734 |
| 6,058,103 | A * | 5/2000 | Henderson et al. | 370/254 |
| 6,104,870 | A * | 8/2000 | Frick et al. | 703/27 |
| 6,108,782 | A * | 8/2000 | Fletcher et al. | 713/153 |
| 6,134,514 | A * | 10/2000 | Liu et al. | 703/17 |
| 6,145,098 | A * | 11/2000 | Nouri et al. | 714/31 |
| 6,212,559 | B1 * | 4/2001 | Bixler et al. | 709/221 |
| 6,216,163 | B1 * | 4/2001 | Bharali et al. | 709/227 |
| 6,226,690 | B1 * | 5/2001 | Banda et al. | 719/315 |
| 6,233,542 | B1 * | 5/2001 | Butts et al. | 703/27 |
| 6,249,755 | B1 * | 6/2001 | Yemini et al. | 702/183 |
| 6,266,721 | B1 * | 7/2001 | Sheikh et al. | 710/100 |
| 6,269,398 | B1 * | 7/2001 | Leong et al. | 709/224 |
| 6,269,401 | B1 * | 7/2001 | Fletcher et al. | 709/224 |
| 6,304,982 | B1 * | 10/2001 | Mongan et al. | 714/38 |
| 6,317,788 | B1 * | 11/2001 | Richardson | 709/224 |
| 6,321,337 | B1 * | 11/2001 | Reshef et al. | 726/14 |
| 6,336,138 | B1 * | 1/2002 | Caswell et al. | 709/223 |
| 6,373,820 | B1 * | 4/2002 | Kim | 370/250 |
| 6,393,386 | B1 * | 5/2002 | Zager et al. | 703/25 |
| 6,393,478 | B1 * | 5/2002 | Bahlmann | 709/224 |
| 6,397,359 | B1 * | 5/2002 | Chandra et al. | 714/712 |
| 6,401,119 | B1 * | 6/2002 | Fuss et al. | 709/224 |
| 6,411,997 | B1 * | 6/2002 | Dawes et al. | 709/224 |
| 6,430,613 | B1 * | 8/2002 | Brunet et al. | 709/223 |
| 6,438,711 | B2 * | 8/2002 | Woodruff | 714/27 |
| 6,463,528 | B1 * | 10/2002 | Rajakarunanayake et al. | 713/1 |
| 6,470,385 | B1 * | 10/2002 | Nakashima et al. | 709/224 |
| 6,487,218 | B1 * | 11/2002 | Ludwig et al. | 370/469 |
| 6,487,587 | B1 * | 11/2002 | Dubey | 709/213 |
| 6,490,617 | B1 * | 12/2002 | Hemphill et al. | 709/223 |
| 6,539,422 | B1 * | 3/2003 | Hunt et al. | 709/217 |
| 6,577,642 | B1 * | 6/2003 | Fijolek et al. | 370/465 |
| 6,603,769 | B1 * | 8/2003 | Thubert et al. | 370/401 |
| 6,654,914 | B1 * | 11/2003 | Kaffine et al. | 714/43 |
| 6,665,537 | B1 * | 12/2003 | Lioy | 455/435.1 |
| 6,714,977 | B1 * | 3/2004 | Fowler et al. | 709/224 |
| 6,823,479 | B1 * | 11/2004 | McElhaney et al. | 714/43 |
| 6,892,229 | B1 * | 5/2005 | Karadogan et al. | 709/220 |
| 6,907,006 | B1 * | 6/2005 | Sakamoto et al. | 370/236.2 |
| 6,970,924 | B1 * | 11/2005 | Chu et al. | 709/224 |
| 2001/0011212 | A1 * | 8/2001 | Raynaud et al. | 703/22 |
| 2001/0052006 | A1 * | 12/2001 | Barker et al. | 709/223 |
| 2001/0056483 | A1 * | 12/2001 | Davis et al. | 709/224 |
| 2002/0169867 | A1 * | 11/2002 | Mann et al. | 709/224 |
| 2004/0071090 | A1 * | 4/2004 | Corson et al. | 370/244 |

FOREIGN PATENT DOCUMENTS

| | | |
|---|---|---|
| EP | 0 910 194 | 4/1999 |
| WO | 98/44428 | 10/1998 |
| WO | WO 200182571 A2 * | 11/2001 |

OTHER PUBLICATIONS

Thottan, Marina and Chuanyi Ji. "Adaptive Thresholding for Proactive Network Problem Detection" Proceedings of the IEEE Third International Workshop on Systems Management, Apr. 24, 1998, pp. 108-116.*

Thottan, Marina and Chuanyi Ji. "Proactive Anomaly Detection Using Distributed Intelligent Agents" IEEE Network, vol. 12, Issue 5, Sep.-Oct. 1998, pp. 21-27.*

Durate, E.P., Jr. et al. "An SNMP-based Implementation of the Adaptive Distributed System-level Diagnosis Algorithm for LAN Fault Management" IEEE Network Operations and Management Symposium, Apr. 1996, pp. 530-539, vol. 2.*

Park, J.T., et al. "The Integration of OSI network management and TCP/IP Internet management using SNMP" IEEE First Intl. Workshop on Systems Management, Apr. 14-16, 1993, pp. 145-154.*

Hiltunen, Matti A. and Schlichting, Richard D. "An Approach to Constructing Modular Fault-Tolerant Protocols," Proc. 12th Symposion on Reliable Distributed Systems (SRDS-12), Oct. 1993, pp. 105-114.*

Dawson, Scott, et al. "Testing of Fault-Tolerant and Real-Time Distributed Systems via Protocol Fault Injection," International Symposium on Fault-Tolerant Computing, Jun. 1996, pp. 404-414.*

Kessler, G. and Shepard, S. "A Primer on Internet and TCP/IP Tools," RFC 1739, Dec. 1994, pp. 1-44.*

Malkin, G. "Traceroute Using an IP Option," RFC 1393, Jan. 1993, pp. 1-7.*

McGregor, G. "The PPP Internet Protocol Control Protocol (IPCP)," RFC 1332, May 1992, pp. 1-12.*

Solomon, J. and Glass, S. "Mobile-IPv4 Configuration Option for PPP IPCP," RFC 2290, Feb. 1998, pp. 1-17.*

Conta, A. and Deering, S. "Internet Control Message Protocol (ICMPv6) for the Internet Protocol Version 6 (IPv6) Specification," RFC 2463, Dec. 1998, pp. 1-18.*

Postel, J. "Internet Control Message Protocol," DARPA Internet Program Protocol Specification, RFC 792, Sep. 1981, pp. 1-21.*

IBM Technical Disclosure Bulletin vol. 38 No. 11 Nov. 1995 pp. 503-504 "Strategy for Testing Distributed File Service".

PCT Search Report mailed Sep. 26, 2000.

* cited by examiner

NETWORK FAULT ISOLATION

RELATED APPLICATIONS

This application is a divisional application of copending U.S. application Ser. No. 09/322,107, filed May 28, 1999.

BACKGROUND OF THE INVENTION

The invention relates to networks such as communication and data networks and more particularly to isolating faults in such networks.

Communication and data networks are rapidly growing in use and complexity. For example, the number of persons using the Internet to transmit and receive data grows on a daily basis. Also, the persons using the Internet are using it more as more websites are added, and as users become comfortable using more services available on-line such as buying goods, instead of just accessing information. The addition of sources of information and services, such as the ever-increasing number of websites, increases the complexity of the Internet. As the use and complexity of networks increases, so does the number of problems experienced by users.

Network service providers want to reduce the impact of network problems on the users, and the cost of network problems to the service providers. Reducing the impact of problems, such as down-time and inability to access the network or particular information or services in the network, increases the users' desire to use a particular network service provider. Ideally, users never want to have problems with the network. Preferably, they want problems to occur infrequently, and when problems do occur, the users want to have the problem corrected quickly. Reducing the cost to the service provider allows the provider to increase profits and/or services to the users. Costs to the network service providers can be reduced in at least three ways: (1) reducing the cost of isolating a problem, (2) reducing the frequency of the problem, and (3) reducing the cost to correct the problem.

One current technique for isolating problems with communication networks is to have the user call a troubleshooting help line. The user calls the help line and describes the user's problem, e.g., what operations the user is unable to perform and what error messages, if any, the user is receiving. A receptionist or technician analyzes the information provided by the user. The receptionist can tell the user what the problem is for problems not requiring tests to diagnose. If diagnosing the problem requires testing, then the technician performs any needed tests on the network. The technician may have to coordinate with other persons, including the user, to perform the needed tests. The technician relays to the user any action that the user needs to take to correct the problem, and/or any information as to what the problem is and how long it will take to correct the problem, either by the user or by the network service provider.

Another technique for isolating network problems involves monitoring information transmitted through the network and analyzing this information. Typically, a central computer collects the information and presents it to a technician in an understandable format. By analyzing the information, problems with the network can be isolated. This technique, however, typically requires complex techniques for collecting, and/or filtering, and/or presenting the data collected. Also, it may be very difficult to isolate many problems using this technique.

SUMMARY OF THE INVENTION

In general, in one aspect, the invention provides a method including indicating to a network diagnostic unit a problem experienced by a user interacting with the network. Data is transferred between the network diagnostic unit and the user and between the network diagnostic unit and portions of the network other than the user to diagnose a cause of the problem. The method also includes reporting to the user an indication of remedial action for correcting the cause.

Embodiments of this aspect of the invention can include one or more of the following features. Indicating the problem can include the user attempting an interaction which results in a failure when sent to the network, to the network diagnostic unit instead. Diagnosing the problem can include adapting to an improper protocol or improper use of a protocol in the interaction attempt by the user and providing an indication to the user of a proper protocol or protocol use associated with the message.

In general, in another aspect, the invention provides a method of improving network operations, the method including identifying symptoms of network faults. Causes of the identified symptoms are associated with the symptoms. Costs are associated with combinations of symptoms and causes. A high-cost combination of cause and symptom having a higher associated cost than costs associated with other combinations of causes and symptoms is identified. The cause in the high-cost combination of cause and symptom is targeted for a reduction in the cost associated with the high-cost combination of cause and symptom.

In general, in another aspect, the invention provides a method of improving network operations, the method including indicating symptoms of network faults along a first axis of a chart. Causes of the symptoms are indicated along a second axis of the chart. Costs associated with combinations of the symptoms and the causes are indicated at points of the chart associated with respective combinations of symptoms and causes.

In general, in another aspect, the invention provides a system for use with a data network, the system including multiple diagnostic units each adapted to communicate with the network including to a network user. A central controller is operatively connected to the diagnostic units, the controller being adapted to communicate with and coordinate operations of the diagnostic units, to instruct the diagnostic units to perform tests adapted to help isolate a network fault, and to analyze test results received from a diagnostic unit to attempt to determine the network fault.

Embodiments of this aspect of the invention can include one or more of the following features. The diagnostic units can be distributed at locations throughout the network. The controller can be adapted to instruct multiple diagnostic units to perform concurrent testing. The controller can be adapted to instruct a diagnostic unit to inject test data into the network. The controller can be adapted to instruct a first diagnostic unit to inject test data into the network and a second diagnostic unit to monitor a network response to the test data injected by the first diagnostic unit. A diagnostic unit can be adapted to accept data from a user in a protocol incompatible with a network element to which the data are intended to be sent, to communicate with the network element using a protocol compatible with the network element, and to communicate with the user using a protocol compatible with the protocol of the data from the user. The controller can be adapted to determine operations to instruct a diagnostic unit to perform based on predetermined business priorities.

In general, in another aspect, the invention provides a network diagnostic unit including a processor selectively operatively connected to first and second portions of a data network, the second portion including a network user. The network diagnostic unit also includes processor-readable memory for storing instructions for causing the processor to: receive first data from a given one of the first and second portions of the network; determine second data corresponding to and simulating the first data in a protocol compatible with the portion of the network other than the given portion; and transmit the second data to the portion of the network other than the given portion.

In general, in another aspect, the invention provides a computer program product for use with a computer installed in a communication network including network elements, the computer program product including instructions for causing a computer to: accept data from a source in a source protocol inconsistent with a network element protocol of a selected network element; establish a communication link with the source; and send an indication of the data received from the source to the selected network element in a protocol consistent with the network element protocol.

Embodiments of this aspect of the invention can include further instructions for causing a computer to determine if the source protocol is inhibiting communication between the source and the selected network element.

In general, in another aspect, the invention provides a computer program product for use with a computer installed in a communication network that includes network elements, the computer program product including instructions for causing a computer to: receive data from a user; inject test data into the communication network in response to the data received from the user; and monitor a network response to the test data.

Embodiments of this aspect of the invention can include further instructions for causing a computer to determine whether to inject more test data into the communication network in accordance with the network response monitored by the computer.

In general, in another aspect, the invention provides a diagnostic system for use in a network, the system including a first diagnostic unit connected to the network and capable of injecting test data into the network. A second diagnostic unit is connected to the network and is capable of monitoring a response to the test data and providing an indication of the monitored response.

Embodiments of this aspect of the invention can include one or more of the following features. The analyzer can be further capable of determining whether more test data should be injected into the network and providing an indication of this determination to one of the diagnostic units. The test data can be first test data and the second diagnostic unit capable of injecting second test data into the network such that the first and second test data affect the network at the same time. The first diagnostic unit can be displaced from the second diagnostic unit in the network.

Various aspects of the invention may provide one or more of the following advantages. Faults can be isolated across a heterogeneous network at various, if not all, protocol layers as identified by the International Organization for Standardization (ISO) model standard number ISO 7498. Faults can be isolated without knowledge of network topology, or updating of knowledge of network topology. Where network topology information is required for fault isolation, network topology can be determined using automated topology discovery algorithms. Repair of isolated faults can be verified. Rule-based reasoning, case-based reasoning, machine learning, fault graphs and other diagnostic knowledge representation techniques from the domain of artificial intelligence can be used to isolate faults. Determined causes of faults can be used to improve the fault-isolating knowledge. Faults in a network can be isolated by a single, integrated system. Active test components can be used to isolate faults by, e.g., injecting test data into a network. Faults can be isolated with more comprehensive automated analysis and more accuracy than passively collecting data and analyzing the passively-collected data. Faults can be isolated quickly and with little or no involvement by support personnel. Fault isolation tests can be performed looking in to a network, away from a user, or looking out from a network, toward the user. These tests can be performed independently of the configuration or operation of the user, or network, respectively. Communication with a network user is possible even if the user's protocol and/or configuration is somehow improper, inhibiting communication with other portions of the network. Adaptations can be made to a network user's improper protocol and/or configuration. The user and/or the network can be emulated to the other. Fault isolation testing can be performed under centralized control. Fault isolation testing at multiple points in a network can be coordinated such that, e.g., tests can be performed simultaneously, and the impact of test data injected into a network at one point in the network can be determined at another point in the network. Fault isolation can be expert-system based. Network users can have faults, causing the user problems, isolated with or without assistance by support personnel. Complex network interactions can be reduced to simple information. Users can be informed as to remedial actions to correct faults causing the user problems, and can be informed of completion of the remedial actions. Network uptime, reliability, performance, and response/repair time can be improved. Symptoms and their root causes can be plotted for determining causes to be targeted for occurrence/cost reduction. Symptoms and their root causes can be monitored to determine improvements in occurrence/cost reduction of symptom-cause combinations.

DESCRIPTION OF PREFERRED EMBODIMENTS

The invention provides techniques for improved fault isolation and fault reduction. Diagnostic devices can be placed throughout a communications network under centralized control. These diagnostic devices can communicate with a user terminal, to determine a problem or symptom experienced by a user, e.g., when trying to transmit or receive data, even if the user terminal cannot communicate using a proper protocol or using a protocol improperly for desired network interactions. Problems or symptoms are what the user reports as evidencing a fault in the network. Faults can also be called causes or root causes. Through communications with the user and other portions of the network, the diagnostic devices, with help from the centralized control if needed, can isolate faults in the network and indicate and record the faults and remedial action and initiate the remedial action. The faults can be monitored and action taken to reduce the frequency at which faults occur. The diagnostic devices may be under the control of an Internet Service Provider (ISP), and remedial action initiated only for faults that the ISP can correct. The diagnostic devices can, however, be under the control of other entities and/or remedial action initiated for causes not correctable by the ISP.

Figure 1:
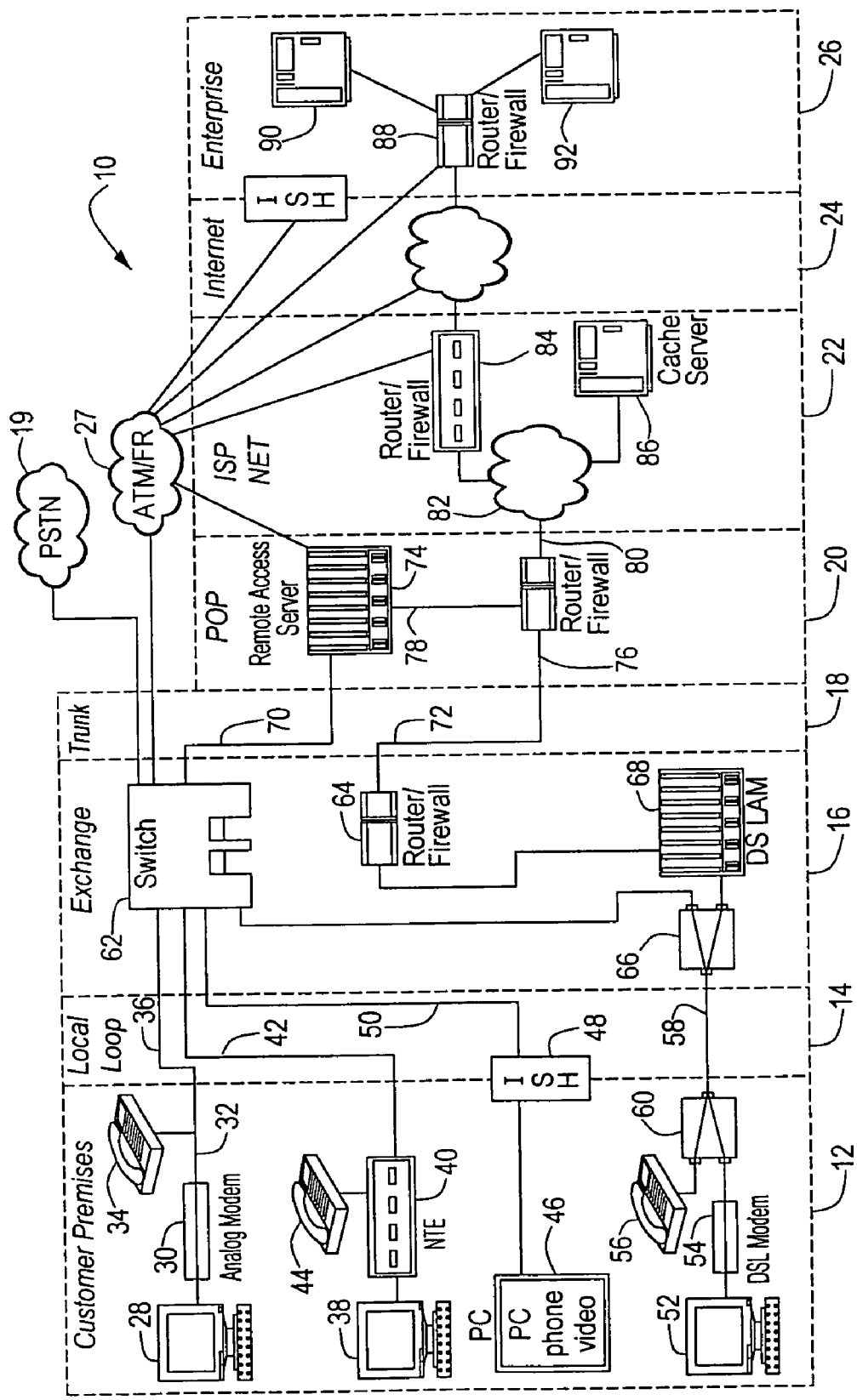
FIGS. 1-2 are partially-schematic diagrams of a communications network.

As shown in FIG. 1, an exemplary communications or data network 10, here involving the Internet, includes customer premises 12, a local loop 14, an exchange 16, a trunk system 18, a Point of Presence (POP) 20, an Internet Service Provider Network (ISP Net) 22, the Internet 24, and an enterprise 26. The network 10 shows an example of connections for users at the customer premises 12 to interact with, e.g., world wide web sites, provided by the enterprise 26.

The customer premises 12 include a variety of possibilities for users' terminals to connect to the local loop 14. For example, a personal computer (PC) 28 connects through an analog modem 30 to a telephone line 32, shared by a telephone 34, that connects to a line 36 in the local loop 14. Another PC 38 connects through Network Termination Equipment (NTE) 40 to a telephone line 42 in the local loop 14. The NTE 40 is also connected to a phone 44. A user interface device 46, that includes a PC, a phone, and video capabilities, connects to a Service Hub (SH) 48, that is an integrated on-demand network, that connects to a line 50 in the local loop 14. Another PC 52 connects to a Digital Subscriber Line (DSL) modem 54. The modem 54 and a phone 56 are coupled to a line 58 in the local loop 14 through a multiplexer 60. The lines 36, 42, 50, and 58, in the local loop are the connections, typically pairs of copper wires, between the user, e.g., the users' home or place of business, and the local telephone company. As used herein, the term "user" can indicate the person interacting with the network 10 and/or the device(s), e.g., a PC, that the user uses to interact with the network 10.

The lines 36, 42, 50, and 58 are connected to the exchange 16, that includes a switch 62, a router/firewall 64, a multiplexer 66, and a Digital Subscriber Line Access Multiplexer (DSLAM) 68. The DSLAM 68 provides a connection between high-speed lines and the router/firewall 64. The switch 62 can connect the incoming line 36, 42, 50, or 58 to the desired trunk, here trunk 70, in the trunk system 18 that is connected to the POP 20 specified by the user's dialed phone number or circuit configuration. Through the multiplexer 66, the incoming line 58 can be connected to the switch 62, or to the DSLAM 68. The DSLAM 68 can process the information from line 58 and transmit the processed information to the router/firewall 64. The router/firewall 64 can inhibit further connection of the user to the network 10, e.g., depending on the requested connection (e.g., to prevent access to age-restricted web sites by users at an elementary school). The router/firewall 64 is connected to the POP 20 through a trunk 72 in the trunk system 18. The exchange 16 is part of a Public Switched Telephone Network (PSTN), the rest of which is indicated by PSTN 19.

The POP 20 includes a Network Access Server (NAS), also called a Remote Access Server (RAS), 74 and a router/firewall 76. The NAS 74 can receive information over the trunk 70 from the exchange 16, and determine whether the information meets required criteria for access to further portions of the network 10. The NAS 74 is connected to the router/firewall 76 by a line 78. The router/firewall 76 can receive information from the router/firewall 64 of the exchange 16 over the line 72 and from the NAS 74 over the line 78, and can route the information through a line 80 to the ISP Net 22.

The ISP Net 22 includes a network 82, a router/firewall 84, and a cache server 86. The network 82 connects the POP 20 to the ISP Net 22 and can route information received from the POP 20 to either the router/firewall 84 or to the cache server 86. The cache server 86 provides cache support to the core network 82 to enable quick transfers of information from the POP 20 to the ISP Net 22. The router/firewall 84 connects the core network 82 to the Internet 24.

The Internet 24 connects the ISP Net 22 to the enterprise 26 to form a link between the user and the enterprise 26. The link allows the information from the user to be passed to the enterprise 26, and information from the enterprise to pass to the user. The Internet 24 is the well-known international communication network of networks providing electronic communication links between, e.g., computer systems.

The enterprise 26 includes a router/firewall 88 and servers 90 and 92. The router/firewall 88 routes information to and from the servers 90 and 92 and the Internet 24. The servers 90 and 92 can provide various information and services such as web sites. For example, server 90 could be a web site for purchasing audio and video recordings and books, and server 92 could be an on-line magazine that provides critiques of items that can be purchased through server 90. Although in this example servers 90 and 92 provide related services/information, this is not required.

As shown, an Asynchronous Transfer Mode/Frame Relay (ATM/FR) network 27 provides protocols for long-distance communications. The ATM/FR network 27 is the backbone network linking the exchange 16, the POP 20, the ISP Net 22, the Internet 24, and the enterprise 26.

Figure 2:
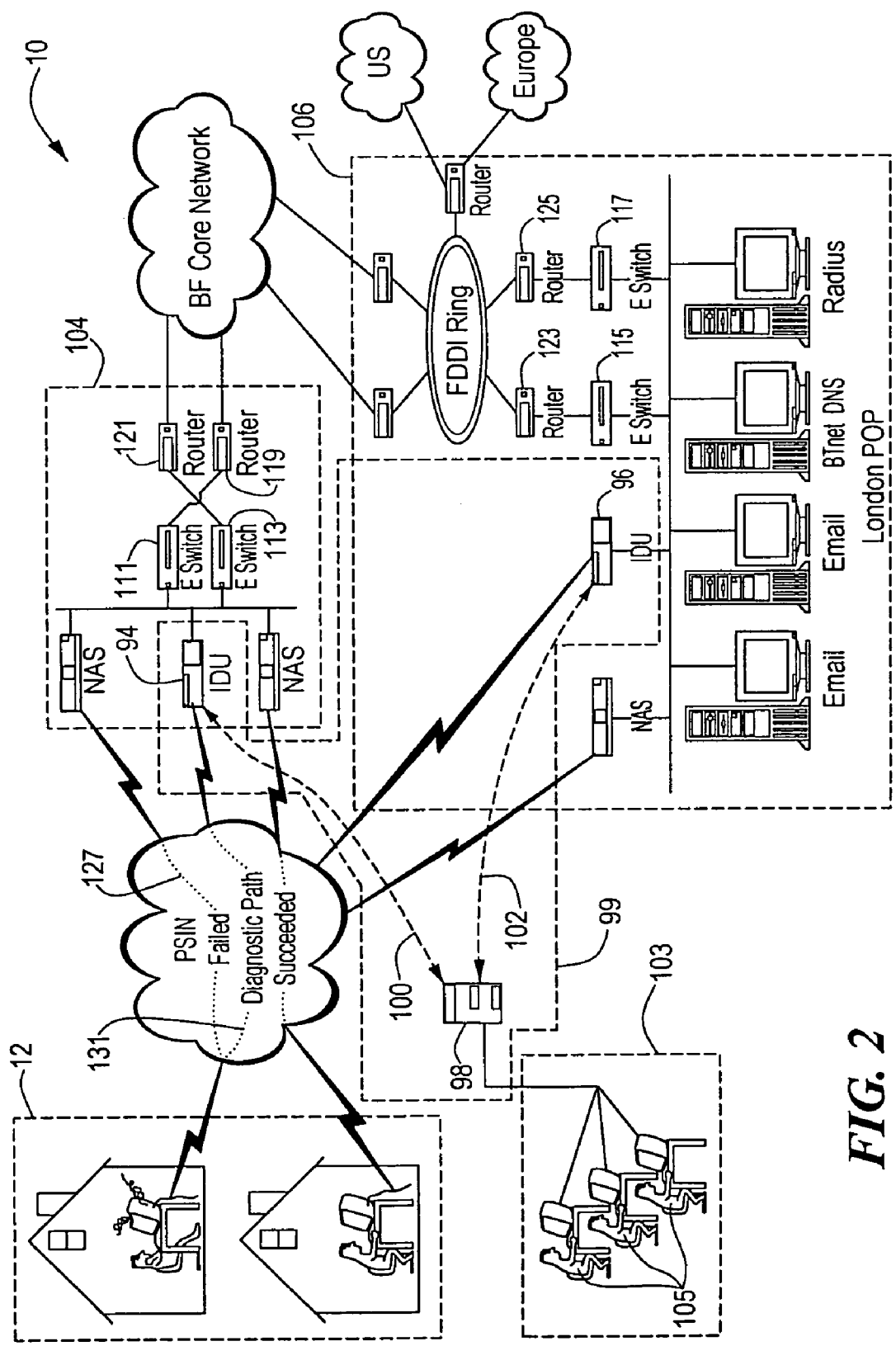

As shown in FIG. 2, the network 10 includes Internet Diagnosis Units (IDUs) 94 and 96 and a system controller 98. Together, the IDUs 94 and 96 and the system controller 98 form a diagnostic system 99 for isolating faults in the network 10. The IDUs 94 and 96 are connected to the central controller 98 for bilateral communication through network connections 100 and 102 respectively. The network 10 also includes several operators or receptionists 105, connected to the system controller 98, that form a reception service 103. Although the receptionists 105 are shown grouped in a common location, they may be distributed at different locations throughout the network 10.

Portions of the network 10 are shown in FIG. 2 in more detail, and other portions shown in less detail, than in FIG. 1. Specifically, two POPs 104, 106 are shown, each including more detail than in the POP 20 shown in FIG. 1. The POPs 104, 106 include ethernet switches (E-Switches) 111, 113, 115, 117 that can inhibit or permit connections to routers 119, 121, 123, 125, respectively. The POPs 104 and 106 include the IDUs 94 and 96 respectively.

The IDUs 94 and 96 are hardware with associated software programs with instructions for the hardware to perform functions to help diagnose and isolate problems in the network 10. The hardware of the IDUs 94 and 96 can be dedicated to diagnosing network problems, or can be non-dedicated and used for other functions as well. An example of a non-dedicated IDU is a personal computer that stores diagnostic software in, e.g., its hard drive, random access memory, read-only memory, a zip drive, a CD-ROM, a floppy disk, or a FLASH ROM.

As shown, the IDUs 94 and 96 are distributed throughout the network 10. IDUs can be present in locations other than POPs, such as in ISP Nets or in the customer premises 12. Due to the flexible nature of software, IDUs can be present at nearly any place in the network 10, and can have portions of their functionality, as described below, in different locations in the network 10. Generally speaking, the more IDUs there are in the system, and the more locations throughout the system where IDUs are present, the better fault resolution there will be in the network 10.

The IDUs 94 and 96 can communicate with portions of the network 10 inward from the user. By looking "in" to the network 10, away from the user, the IDUs 94 and 96 can determine if problems exist with the network 10 independent of problems with the user's information or configuration. The IDUs 94 and 96 can communicate with the network 10 using their own predetermined information that is compatible with the network 10. Thus, the IDUs 94 and 96 can simulate the user to the network 10 in a way that is compatible with the network 10, even if the user's configuration is incompatible with other portions of the network 10. The IDUs 94 and 96 can introduce or inject test data into the network 10. Results of the test are monitored by the IDUs 94 and 96 and sent to the central controller 98 for analysis.

The test data can be designed and intended, e.g., to eliminate one or more categories of possible causes of a problem, to eliminate a specific possible cause, to identify one or more categories of possible causes of a problem, or to determine that a specific possible cause is the actual cause of a network problem. Injected test data of this last type can be called a "ping."

The IDUs 94 and 96 can communicate with the user independently of the other portions of the network 10. By looking "out" of the network 10, toward the user, the IDUs 94 and 96 can determine if faults exist with the user independent of faults with the network's information or configuration. Thus, the IDUs 94 and 96 can simulate portions of the network 10 to the user even if failures in the network would otherwise inhibit or prevent communication with the user. For example, the IDUs can accept a Domain Name System (DNS) request from the user even if the request is directed to an erroneous IP address. The IDUs can perform an appropriate lookup and supply a correct DNS response. The IDUs can also inject test data into or introduce test data to the user's system, monitor the results, and pass the results to the central controller 98. By communicating with the user and the rest of the network 10, the IDUs 94 and 96 can serve as a network access server, at least during diagnosis of network problems.

To aid communication with the user, the IDUs 94 and 96 include software to implement a Fault-Tolerant Protocol stack. This protocol stack allows the IDUs 94 and 96 to establish a link with the user even if the user is attempting to communicate with the network 10 using an improper protocol or configuration. The IDUs 94 and 96 can communicate with users that are supplying a protocol that is inconsistent with a protocol of an element of the network with which the user wants to communicate. This allows the system 99 to communicate with the user, e.g., to send diagnostic information to the user, to help isolate the fault causing the problem/symptom that the user is experiencing, when the user might otherwise not be able to communicate with the network 10 at all, and therefore not understand why the user is unable to communicate as desired with the network 10.

The Fault-Tolerant Protocol stack allows communication with an improperly configured user by adapting to the user's protocol interactions, correct or incorrect. Using the Fault-Tolerant Protocol stack, an IDU adapts to the user's setup to allow connections to be made and communication to proceed. Protocols include indications of transaction steps, data format, and data, e.g., an Internet Protocol (IP) address. Thus, for example, during Internet Protocol Control Protocol (IPCP) negotiations the IDU can accept an IP address if the user insists on one, or can assign an IP address if the user does not insist on one. The IDU also logs information about the user's behavior and/or setup for comparison against a database to determine errors with the user's behavior and/or setup, e.g., the user attempting to connect with a static IP address while the database indicates that the user should connect with a dynamic IP address.

The system 99 employs a topology-independent protocol-centered approach to isolate faults. This approach allows the system 99 to isolate faults without having predetermined knowledge of network topology. The system 99 can determine if the network 10 contains a fault without having to know how the network 10 is composed. Based on protocols, the system 99 can adapt to different topologies and determine that a fault exists. If, however, the system 99 needs or wants to have topology information to isolate particular faults, the system 99 employs automated topology discovery algorithms. These algorithms can determine the topology of the network 10, such as what hardware is in the network 10, how the hardware is connected, and what portions of the network 10 are accessible.

The system controller 98 controls the system 99 in order to diagnose and isolate root causes of network problems. The controller 98 is a high-speed computer capable of implementing artificial intelligence to isolate network problems. Indications of problems are sent to the controller 98 by the IDUs 94 and 96. The controller 98 coordinates the isolation of the root cause of the problem(s) by, e.g., instructing an IDU to monitor certain information which the controller 98 can filter and analyze. The controller 98 can also have an IDU inject test data, e.g., test protocols, into the network 10. Instructions from the controller 98 may request that the user perform some operation. Also, the controller 98 can have multiple IDUs perform coordinated tests, such as by injecting data into different portions of the network 10 such that one or more portions of the network 10 are processing test data (the test data are affecting the network) at the same time, or by injecting test data in one portion of the network 10 and monitoring results at another portion of the network 10. This allows for complex testing of network responses that would not be possible if a single IDU were used, or if multiple IDUs were used that could not act in conjunction with each other. One or more of the diagnostic features of the controller 98 can be provided for, e.g., programmed into, the IDUs 94 and/or 96. Thus, the IDUs 94 and/or 96 can diagnose network faults themselves, independently of a controller.

The IDUs 94 and 96 can communicate with the user through a portion of the network 10 called a user link. The user link communicates directly with the user and is an interface between the user and the system 99. The user link provides data to the user such as prompts for requesting information such as the nature of the problem encountered by the user. Status data are supplied to the user through the user link, as well as indications of the results of the fault isolation performed by the controller 98. The controller 98 determines what data to present to the user through the user link to help isolate the fault(s) and to inform the user of the results.

Figure 3:
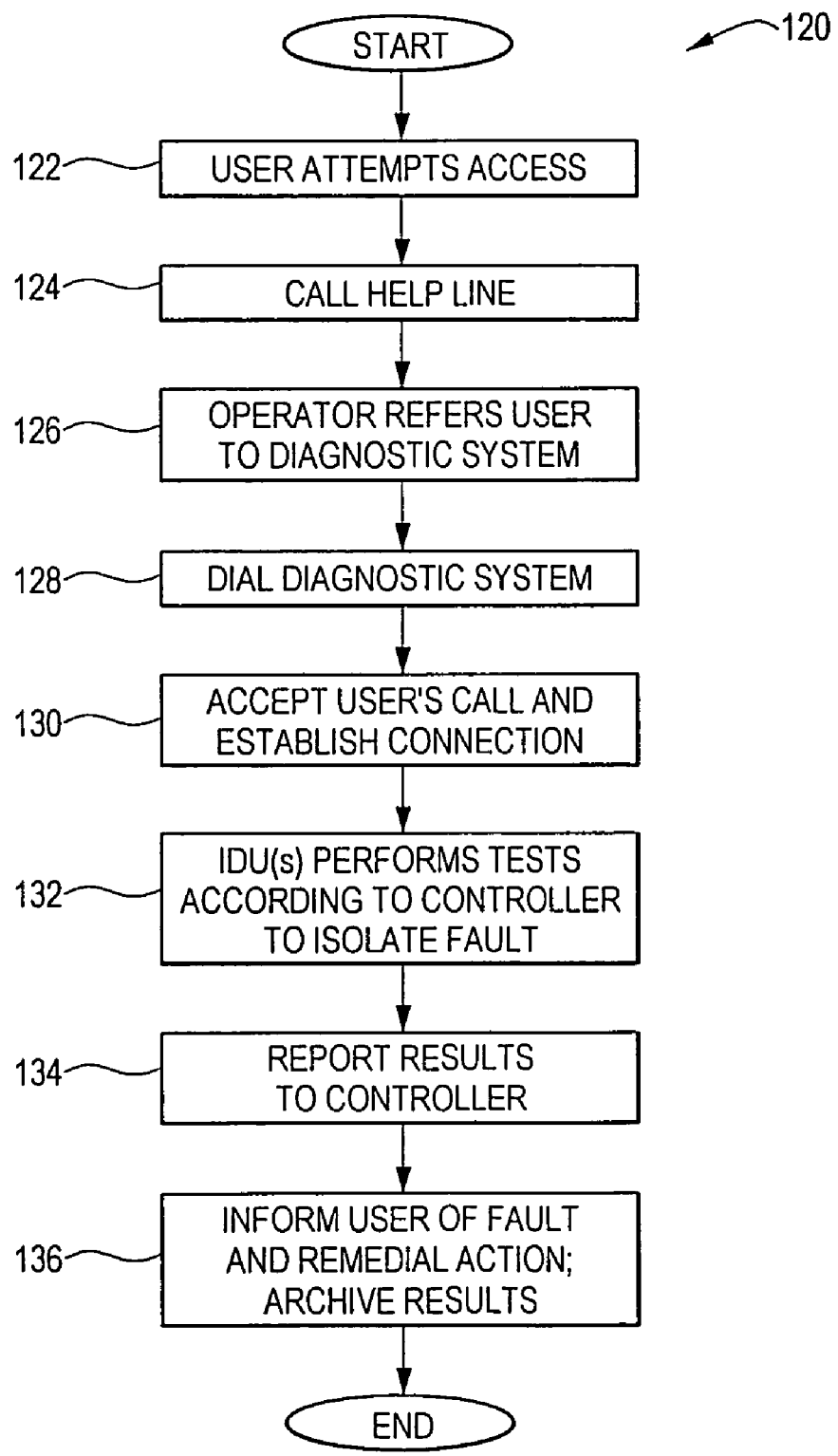
FIG. 3 is a block diagram of a process of isolating faults in the communications network shown in FIG. 1.

FIG. 3 illustrates a process 120 for isolating faults in the network 10. As shown, at stage 122, the user attempts to access a portion of the network 10, e.g., a web site, through a path 127 (FIG. 2) but fails. To try and resolve the failure, the user calls a help line at stage 124. An operator at the help desk talks to the user to attempt to isolate and correct the failure. To assist with the isolation, especially for failures that the operator cannot quickly isolate, the operator instructs the user to dial a diagnostic number. At stage 128, the user calls the diagnostic number associated with an IDU, e.g., IDU 94 (FIG. 2). The operator can remain in contact with the user, e.g., if the user is not comfortable interacting with the IDU 94 through the user link. At stage 130, the IDU 94 accepts the call from the user to form a diagnostic path 131 (FIG. 2) and attempts to negotiate a connection with the user (e.g., the user's PC). During negotiation, the user and the IDU communicate in order to find a compatible set of values from sets of acceptable values that each has. At stage 132, one or more IDUs, e.g., IDUs 94 and 96 (FIG. 2), under instructions from the controller 98 (FIG. 2), perform tests on the network 10 (FIG. 2). The tests continue, using the feedback of prior tests to determine more tests, until a fault is isolated, if possible. The results of the tests are reported by the IDU(s) 94 (and 96) to the controller 98 at stage 134. At stage 136, remedial action is initiated if possible. For example, a message can be sent to the ISP Network Operations Center (NOC) at the ISP Net 22 (FIG. 1) indicating the cause of action to correct/fix the cause. Messages can be sent to other portions of the network 10 (FIG. 1), even if not under the control of the ISP. Also, the user is informed, e.g., by the IDU 94 or by the operator, of the fault and of any remedial action being taken and by whom, remedial action to be taken by the user, or why no remedial action is being taken. The results of what root cause or fault produced the problem reported by the user are archived for future processing to, e.g., attempt to reduce the occurrence of faults. The process 120 ends, e.g., by disconnecting the user from the system 99 (FIG. 2).

Figure 4:
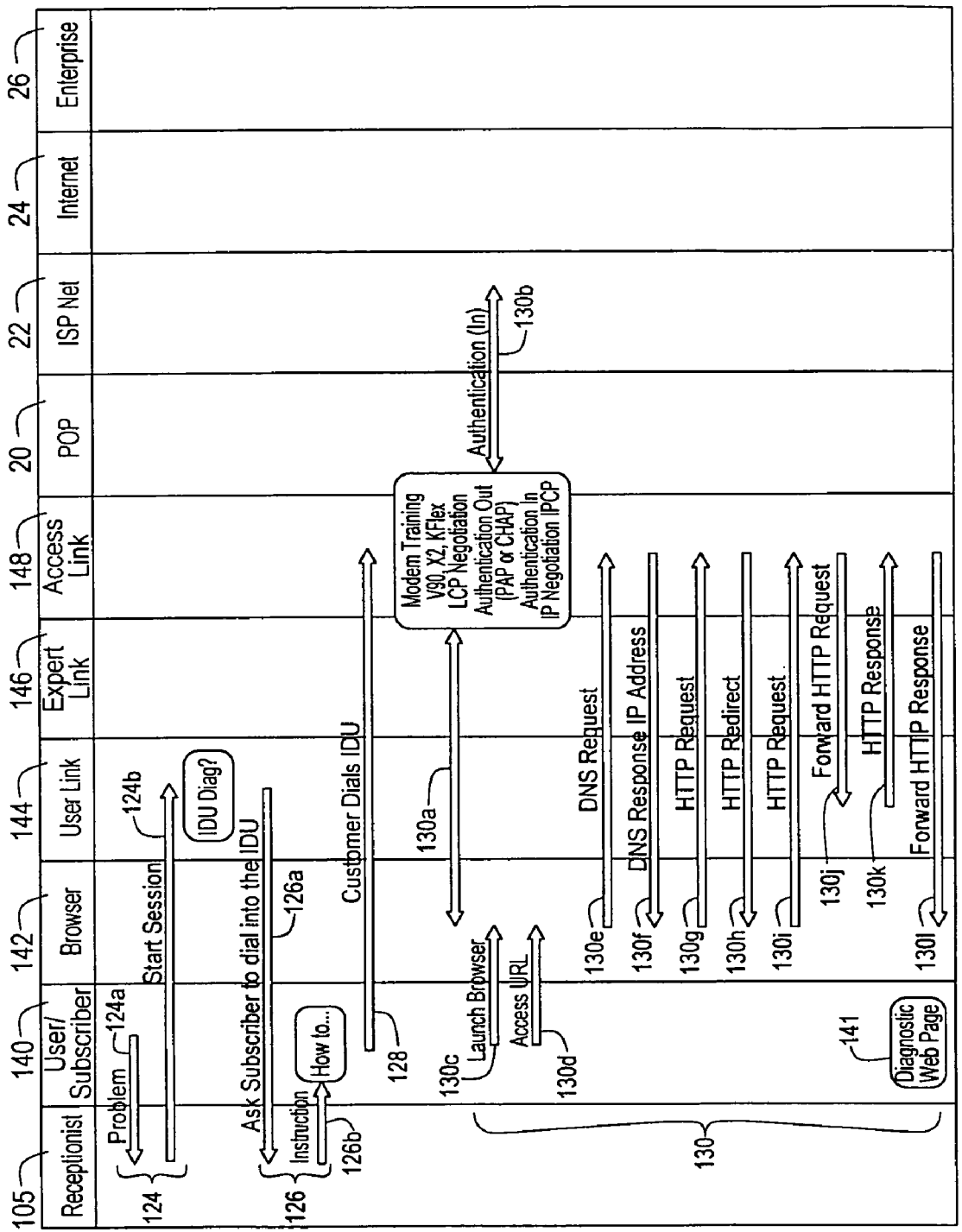
FIG. 4 is a functional diagram of interactions between portions of the network shown in FIG. 1.

As shown in FIG. 4, stages 124, 126, 128, and 130 (FIG. 3) involve several transactions with a receptionist 105 (FIG. 2), the user (subscriber) 140, the user's browser 142, the user link 144, an expert link 146 (e.g., the system controller 98—FIG. 2), an access link 148 (e.g., an IDU), the POP 20 (FIG. 1), and the ISP Net 22 (FIG. 1). The browser 142 can include any network application, such as Email, web browsing, messaging services, audio, video, chat, Voice Over Internet Protocol (VoIP), file transfer, automated software updates, medical patient status monitoring, distance learning, and network news applications. Arrows in FIG. 4, and similar figures below, indicate the direction(s) of data flow.

In stage 124, the user 140 calls the receptionist 105 to report a problem at stage 124a. In response to the user's call, the receptionist 105 starts a user link session with the user link (i.e., user interface) 144 at stage 124b. The receptionist 105 interacts with the user link 144 to relay information about the user's reported problem.

In stage 126, the user link 144 reaches a conclusion to have the user 140 dial in to the access link/IDU 148. At stage 126a, the user link 144 conveys this conclusion to the receptionist 105 and the receptionist 105 provides appropriate instructions to the user 140 at stage 126b.

At stage 128, the user 140 dials the IDU 148 as instructed. The IDU 148 answers the user's call such that appropriate actions can take place to establish communication between the user 140 and the IDU 148.

At stage 130, and in particular stage 130a, appropriate modem training and Point to Point Protocol (PPP) negotiating, with corresponding data logging and analysis, occurs until the user (e.g., the user's terminal) 140 and the IDU 148 can communicate. If the user 140 cannot access the IDU 148, then the receptionist 105 can perform a guided diagnostic session to diagnose a fault or faults causing the user's problem(s). Some faults may not be able to be isolated using this guided session. For example, problems relating to connectivity to a POP may not be diagnosable due to the user's inability to connect to the IDU 148. If the user 140 was locked to an X2 protocol and the user's call was answered by a standard NAS that only supported KFlex, V.90, and slower protocols, then the connection between the NAS and the user 140 may fail. The Fault-Tolerant Protocol stack of the IDU 148, however, is able to communicate with a wide variety of protocols in order to negotiate a compatible protocol between the IDU 148 and the user 140. Also, the IDU 148 and the user 140 negotiate a Link Control Protocol (LCP). Again, if a standard NAS is used in place of the IDU 148, this negotiation may fail, e.g., if the user's PPP requires Password Authentication Protocol (PAP) while the NAS may only allow CHAP. The IDU 148; however, will allow many options to accommodate different user requirements.

At stages 130a and 130b, IDU-to-user authentication ("Out") and IDU-to-ISP Net authentication ("In") occurs. The IDU 148 looks out toward the user's browser 142 to authenticate the user's password for use with the IDU 148. Data are logged and analyzed. At stage 130b, the IDU 148 looks in to the network 10 (FIG. 1) toward the ISP Net 22 to authenticate the password supplied by and captured from the user 140 for use with the ISP Net 22. IPCP negotiating occurs between the IDU 148 and the user 140, and data are logged and analyzed (e.g., an Internet Protocol address/netmask is assigned). If a standard NAS is used instead of the IDU 148, then this negotiation may fail, e.g., if the user's IP stack is configured for static IP and the NAS is configured for dynamic allocation. The fault-tolerant IDU 148, however, can allow for different IP addresses to support (and detect) misconfigured users 140 to help ensure that the negotiation succeeds. The IDU 148 also opens a control session with the ExpertLink/controller 146 and sends subscriber information to the controller 146.

At stage 130c, the user 140 launches the user's browser 142, e.g., an Internet browser. At stage 130d, the user 140 provides a URL to the browser 142 according to the receptionist's 105 instructions.

The browser 142, IDU 148, and user link 144 enter into a series of transactions to establish communication between the user 140 and the IDU 148. At stage 130e, the user's browser 142 sends a DNS request to the IDU 148, which responds to the browser 142 at stage 130f with a DNS response. While a system with a standard NAS may fail if the user uses an improper DNS server, or the DNS server is down, the fault-tolerant IDU 148 can provide DNS service. At stage 130g, the browser 142 sends a Hypertext Transfer Protocol (HTTP) request to the IDU 148, which responds to the browser 142 at stage 130h with an HTTP redirect response, forwarding the browser 142 to a canonical URL (e.g., http://www.diag.com/Start/). The browser 142 sends a DNS request for the canonical URL and the IDU 148 sends a DNS response for the canonical URL to the browser 142. The browser 142 establishes a Transmission Control Protocol (TCP) connection with the IDU 148 and sends an HTTP request at stage 130i to the IDU 148 for the canonical URL.

At stage 130*j*, the IDU 148 forwards the HTTP request to the user link 144, which sends an HTTP response of an initial user link page to the IDU 148 at stage 130*k*. At stage 130*l*, the IDU 148 forwards the HTTP response to the browser 142, e.g., to display a diagnostic web page 141 on the user's terminal.

Referring again to FIG. 3, with a connection established with the user in stage 130, the process 120 continues to stage 132 where one or more of the IDUs 94 and 96 (FIG. 1) perform tests to isolate the fault causing the user's problem. Depending on information provided by the user and results of tests performed by one or more of the IDUs 94 and 96, the controller 98 (FIG. 1) determines how to proceed with isolating the root cause of the problem. To do this, the controller 98 runs artificial-intelligence-based diagnostic process control software containing series of paths of action.

Figure 6:
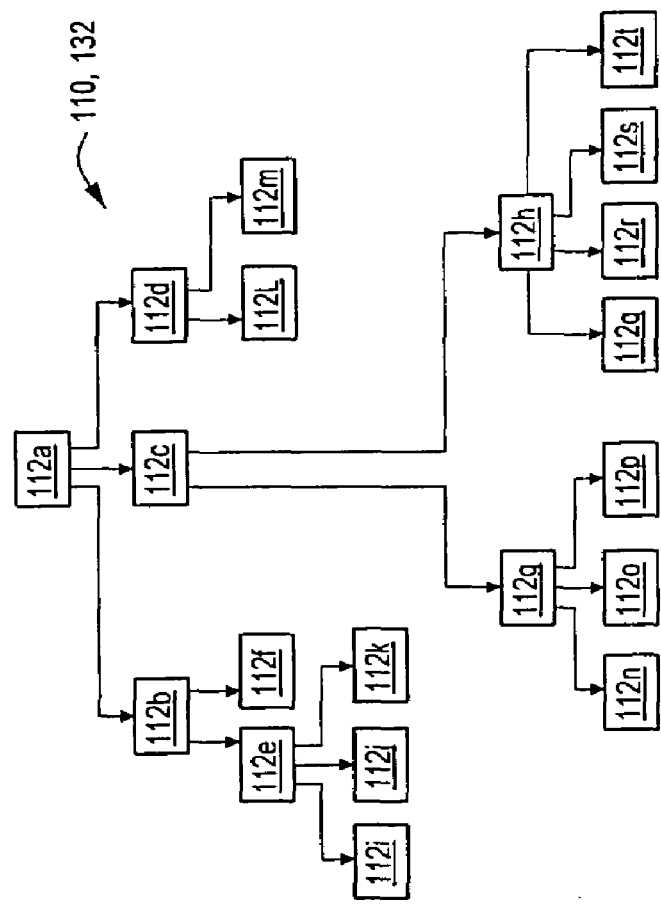
FIG. 6 is a block diagram of an directed acyclic graph implementing a representation of network diagnostic knowledge.
Figure 5:
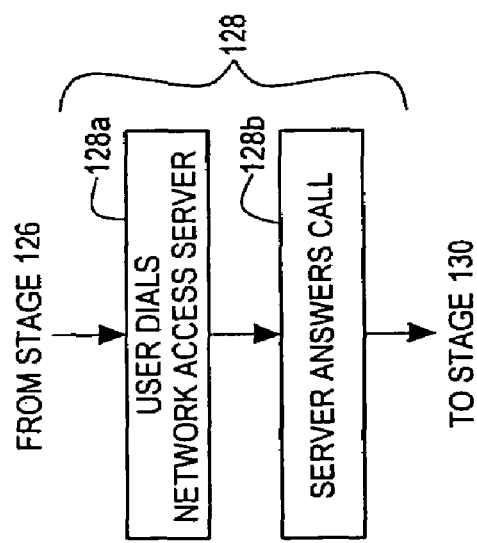
FIG. 5 is a block diagram of a process of a user dialing in to a diagnostic unit.

A simplified example of a Directed Acyclic Graph (DAG) 110 illustrating software instructions implemented by the controller 98 in stage 132 is shown in FIG. 6. A series of tests indicated in the DAG 110 by nodes or boxes 112*a*-112*t* are connected by paths indicated by the arrows connecting the boxes 112*a*-112*t*. The tests can be, e.g., questions for the user 140 (FIG. 4), or data monitored from or injected into the network 10 (FIG. 1) by one or more IDUs 94, 96 (FIG. 2). Information supplied by the user and/or the results of the tests determine what path to follow. These data are processed according to decisions that implement, e.g., business priorities such as reducing repair cost and/or repair time.

When the DAG 110 reaches one of the terminating nodes 112*f*, 112*i*, 112*j*, 112*k*, 112*l*, 112*m*, 112*n*, 112*o*, 112*p*, 112*q*, 112*r*, 112*s*, or 112*t*, the fault has been isolated to the extent possible by the DAG software. At this point, the results are reported to the controller 146 (FIG. 4; stage 134, FIG. 3), and the controller 146 can initiate remedial action, inform the user 140 (FIG. 4) of the action, or instruct the user 140 to take the remedial action (stage 136, FIG. 3). Other information may also be provided, such as when the remedial action may be completed. Archived fault isolation results (stage 136, FIG. 3) can be used to improve the DAG 110. By analyzing stored combinations of user problems/symptoms and the faults/causes leading to those problems/symptoms, the DAG 110 can be modified to more accurately and more quickly isolate faults.

Figure 7:
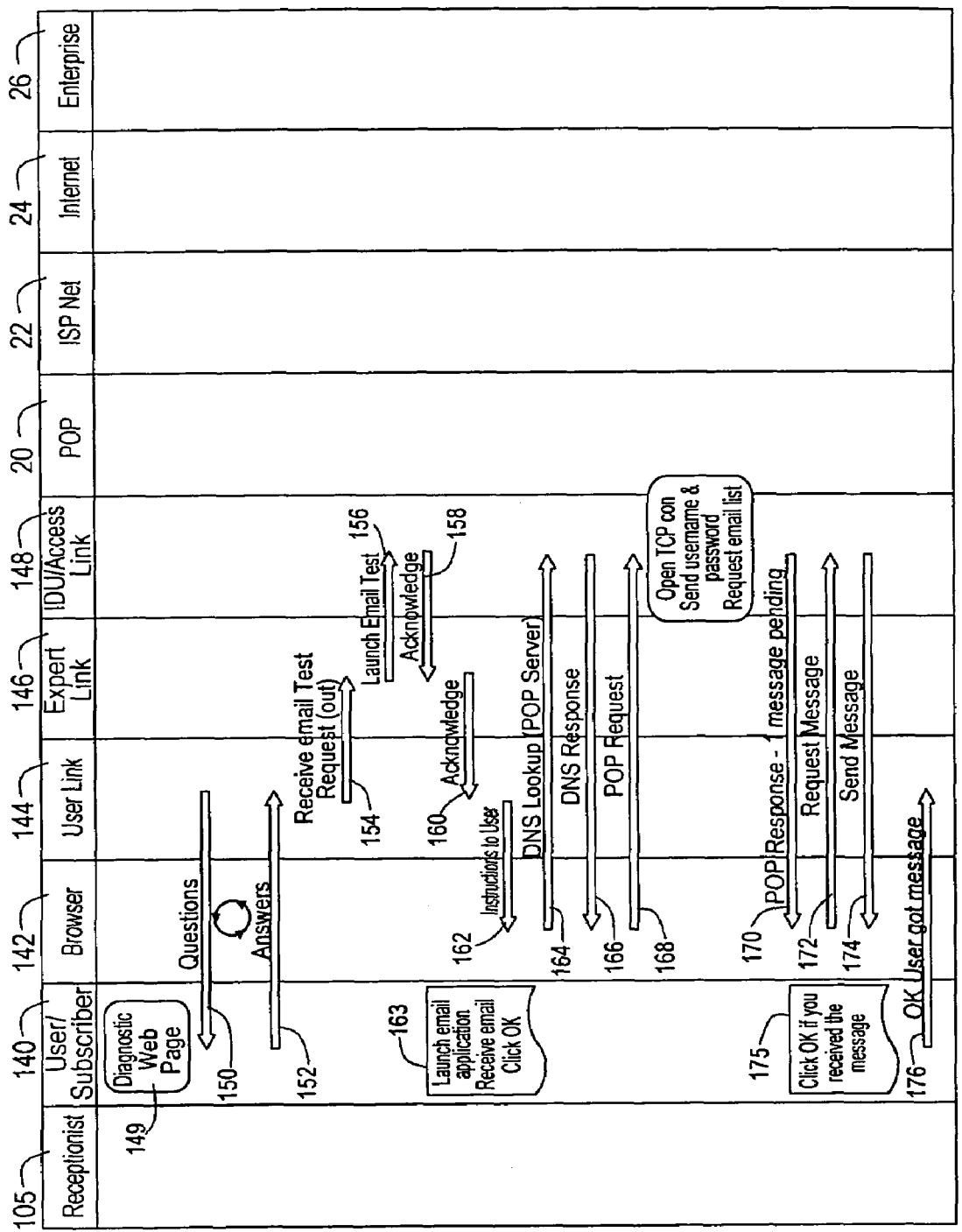
FIGS. 7-15 are functional diagrams of interactions between portions of the network shown in FIG. 1 for isolating faults in the network.
Figure 8:
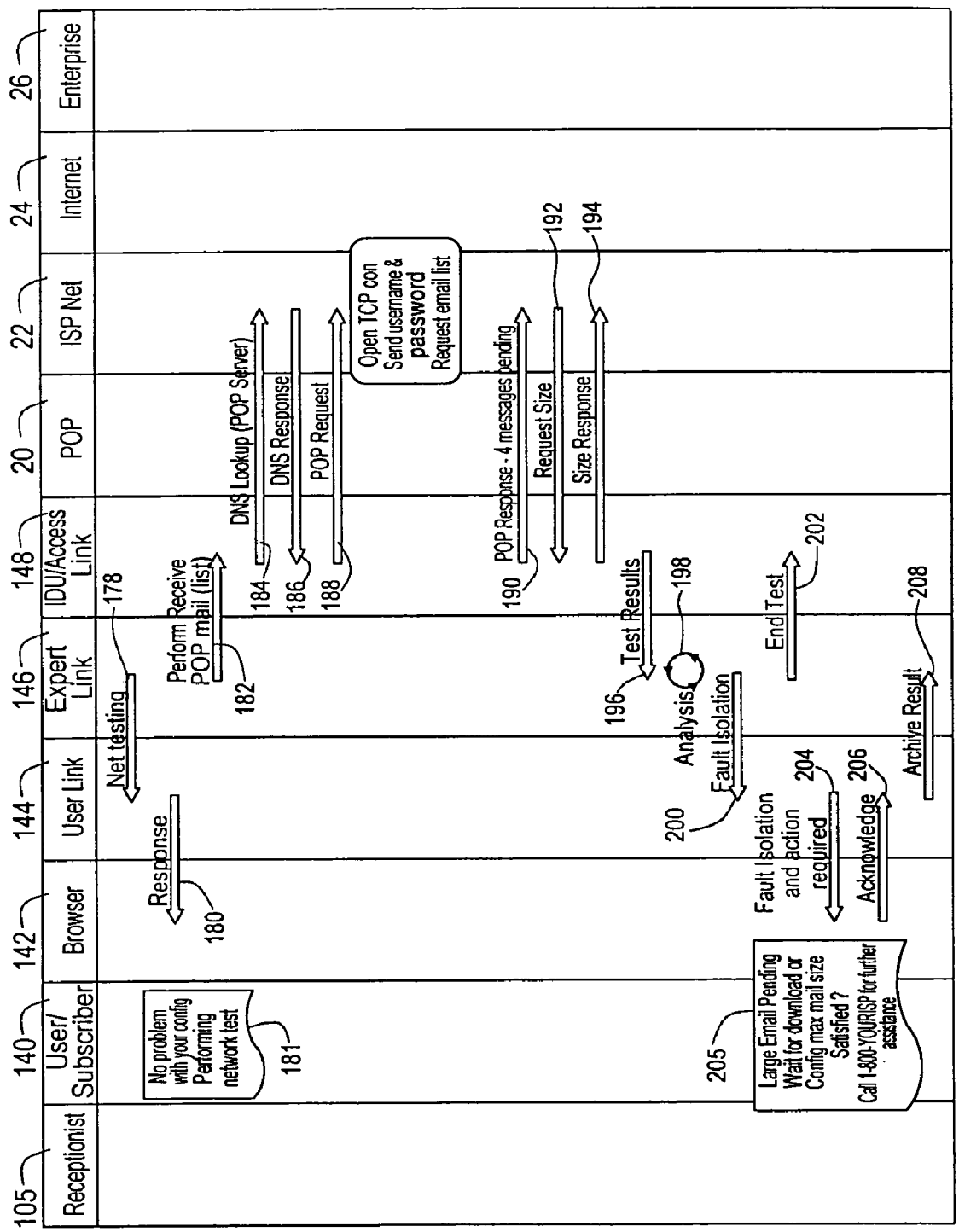

FIGS. 7-8 illustrate exemplary transactions for isolating a fault, as indicated by stage 132 of FIG. 3, in which the fault or root cause is a large Email message in a POP queue and the user is canceling attempts for receiving Email before the Email can download.

Referring to FIG. 7, at stages 150 and 152, the user 140 and the user interface 144 interact to determine the user's problem. Several interactions may be necessary with the user 140 supplying information prompted by the user link 144, e.g., through a diagnostic web page 149 displayed on a monitor of the user's computer. This interaction continues until the initial problem of the user 140 is described adequately.

At stages 154, 156, 158, and 160, a receive Email test is performed. At stage 154 the user link 144 issues a receive Email test request to the expert link 146. The expert is link 146 forwards the received Email test to the IDU 148 at stage 156. In response, at stage 158 the IDU 148 acknowledges what test resources are available. At stage 160, the expert link 146 acknowledges to the user link 144 that the expert link 146 is beginning the test. At stage 162, the user link 144 instructs the browser 142 to display an instruction page 163 for the user 140 to see. The instruction page 163 instructs the user 140 to retrieve Email in a normal fashion by launching the user's Email application and e.g., using a mouse or actuating a continue button as appropriate in the browser 142.

At stages 164, 166, 168, 170, 172, and 174, the browser 142 and the IDU 148 interact to perform the received Email test looking out. At stage 164 the user 140 has started the user's Email program and attempted to retrieve Email as instructed by the user link 144, and the browser 142 sends a DNS request for the POP server to the IDU 148. The IDU 148 sends a DNS response at stage 166. At stage 168 the browser 142 sends a POP request (e.g., to open a TCP connection, and sending the usernames' password, and Email list request). At stage 170, the IDU 148 sends a POP response that there is one message pending. At stage 172, the browser 142 sends the IDU 148 a request message or read command. The IDU 148 responds at stage 174 by sending a predetermined test diagnostic message to the Email application of the browser 142. At the same time the user link 144 can update the user's browser 142 with additional instructions. For example, the user 140 can be presented with a page 175 indicating an option to click a mouse on a designated area of the user's monitor if the user 140 received the message. The user 140 issues a POP quit indication and the IDU 148 sends the results of this test to the expert link 146.

Referring also to FIG. 8, at stages 176, 178, and 180, an Email test looking into the network 10 (FIG. 1) is initiated. At stage 176, the user 140 sends an HTTP request, e.g., by clicking on a continue button on the user's monitor. The user link 144 queries the expert link 146 as to what operation to perform. At stage 178 the expert link 146 instructs the user link 144 that a receive Email test looking in is to be performed. At stage 180, the user link 144 sends an HTTP response to the browser 142 in order to inform the user 140 as to what is happening. For example, the user 140 may be presented with a page 181 indicating that there is no problem with the user's configuration, and that a network test is being or will be performed.

At stages 182, 184, 186, 188, 190, 192, 194, 196, and 198, the receive mail test looking into the network 10 (FIG. 1) is performed and results analyzed. At stage 182, the expert link 146 instructs the IDU 148 to initiate the receive Email test looking into the network 10 (FIG. 1). The IDU 148 acknowledges that the test is to be performed. the IDU 148 sends, at stage 184, a DNS request for the POP server to the DNS server of the ISP Net 22. At stage 186 the ISP Net 182 sends a DNS response to the IDU 148. At stage 188, the IDU 148 sends a POP request (e.g., to open a TCP connection, sending the user's name and password, and requesting an Email list). At stage 190 the POP server of the ISP Net 22 sends a POP response to the IDU 148 indicating that e.g., four message are pending. The IDU 148, at stage 192, requests the sizes of the pending messages from the ISP Net 22. At stage 194, the ISP Net 22 sends indications of the sizes of the pending messages to the IDU 148. The IDU 148 requests the transfer of portions of the pending messages to obtain transfer statistics for the messages. At stage 196, the IDU 148 returns the results of the receive Email test looking into the network 10 (FIG. 1) to the expert link 146. At stage 198, the expert link 146 analyzes the results received from the IDU 148 to isolate the problem. As noted above, the IDU 148 can include diagnostic abilities and therefore the analysis at stage 198 can be performed in the IDU 148.

At stages 200, 202, 204, 206, and 208, results of the fault isolation are provided to the user 140 and archived for further use. At stage 200, the expert link 146 sends indications of the results to the user link 144. At stage 202 the expert link 146 tells the IDU 148 to close the test that the IDU 148 was performing, here the receive Email test looking into the network 10 (FIG. 1). The IDU 148 closes whatever connection it currently has e.g., a POP connection. The user link 144 notifies, at stage 204, the browser 142 of the results of the test. The results provided to the browser 142 include any action required, and could also request more information from the user 140 in order to decide what, if any, further test to perform. An example page 205 of the results of the test provided to the browser 142, as shown in FIG. 8, indicates to the user that a large Email is pending, and instructs the user to wait for the download of this Email, or to verify the maximum Email size receivable by the user 140 or to reconfigure this maximum Email size if it is not large enough to receive the pending Email. The information provided also prompts the user 140 to indicate whether the user 140 is satisfied with the information provided. At stage 206 the browser 142 sends an indication of whether the user 140 is satisfied to the user link 144. At stage 208 the results of the session are archived into a data base for future use.

Figure 9:
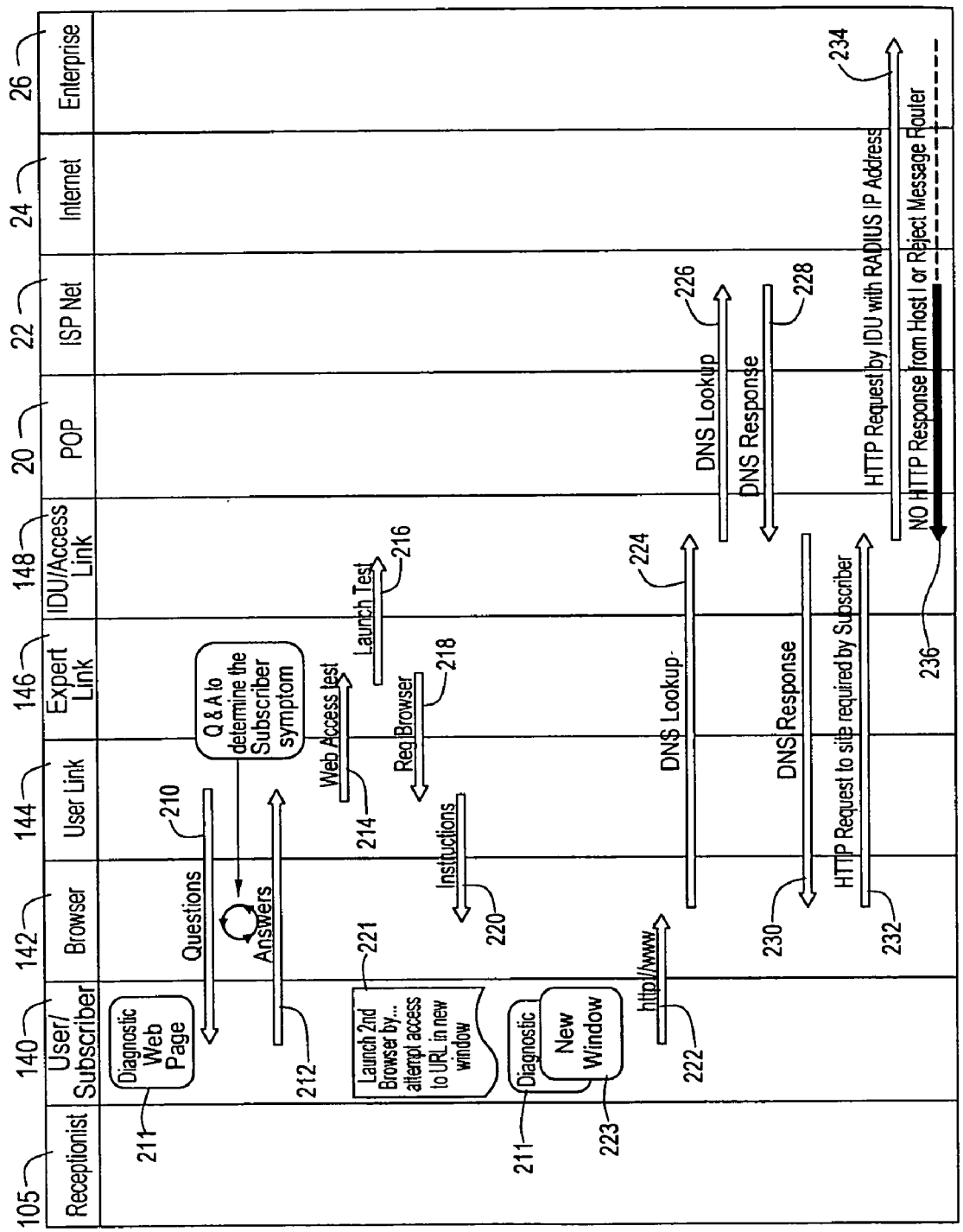
Figure 10:
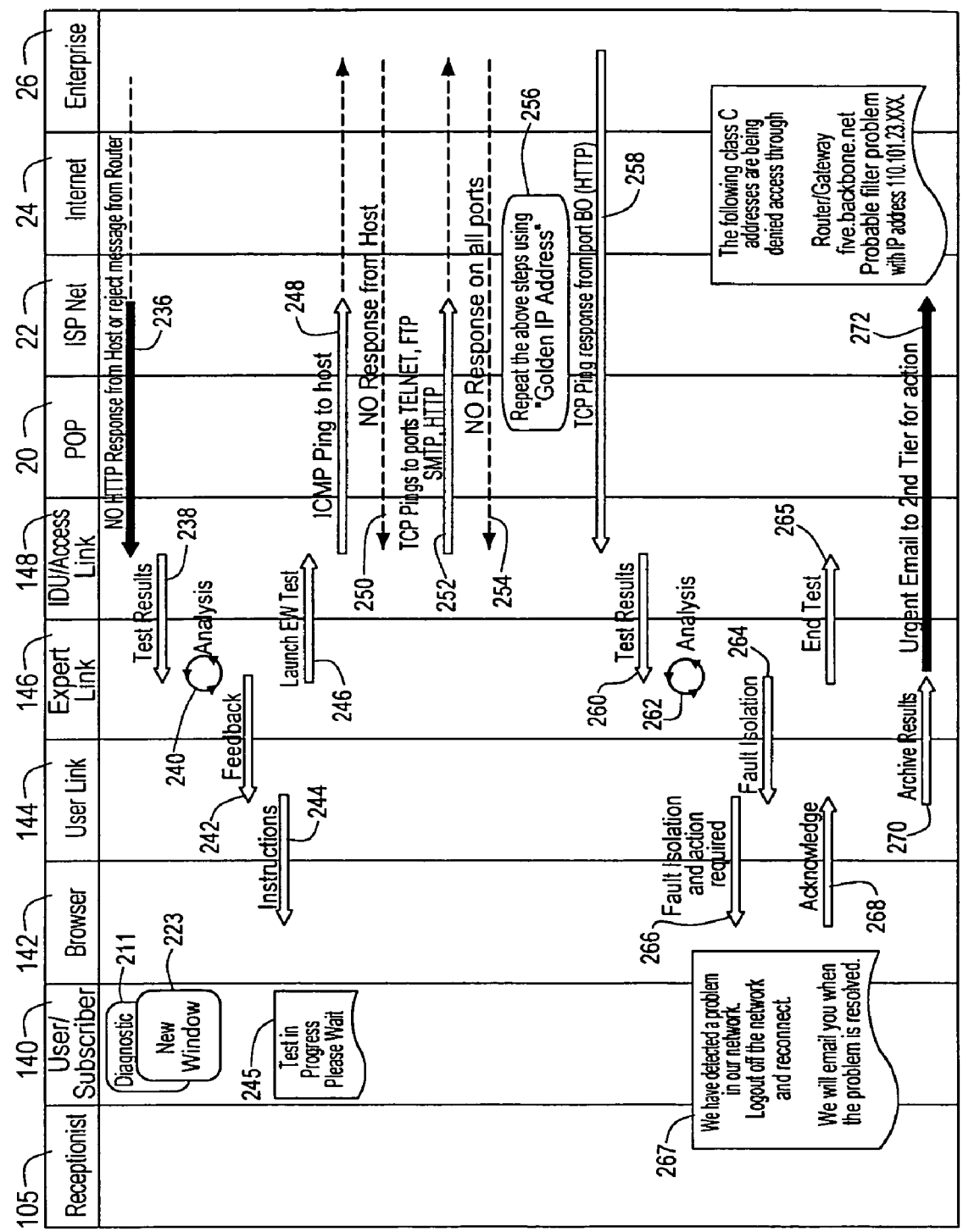

FIGS. 9-10 show the fault isolation stages for a situation where the user 140 cannot access any web pages. The inability to access the web pages may be intermittent from connection to connection. In this example, the root cause is an assignment of a recently-opened IP address range that is not configured in firewall filters (i.e., the prototype scenario). The user 140 is connected to the IDU 148 as described above with respect to FIG. 4.

At stages 210 and 212, the user 140 and the user link 144 interact to establish a problem description. The user link 144 queries, at stage 210, the user 140 as to the nature of the user's problem(s) via a page 211. The user 140 answers, at stage 212, with a description of the problem(s). Stages 210 and 212 can repeat, with different questions being asked by the user link 144 until adequate answers describing the problem(s)/symptom(s) are provided by the user 140.

At stages 214, 216, 218, and 220, a web access test is initiated. At stage 214, the user link 144 requests the web access test of the expert link 146. The expert link 146, at stage 216, requests the web access test looking in to the network 10 (FIG. 1) from the IDU 148. The IDU 148 acknowledges the test request to the expert link 146. At stage 218 the expert link 146 acknowledges the web access test to the user link 144. At stage 220, the user link 144 provides an instruction page 221 to the browser 142. The instruction page 221, e.g., instructs the user 140 to bring up a new window 223 and to access a URL in the new window 223 enters the new URL in the new window.

At stages 222, 224, 226, 228, 230, 232, 234, 236, 238, and 240 the web access test is performed and analyzed. At stage 222, the user 140 enters the new URL in the new window 223 as directed by the instruction page 221 sent from the user link 144 at stage 220. At stage 224, the browser 142 sends a DNS request to the IDU 148. The IDU sends, at stage 226, a DNS look-up request to the ISP Net 22. At stage 228, the DNS server of the ISP Net 22 sends a DNS response to the IDU 148. The DNS response contains a numerical IP address corresponding to the host name contained in the DNS look-up request so that the browser 142 can connect to the desired server. At stage 230, the IDU 148 sends the DNS response to the browser 142. The browser 142, at stage 232, sends an HTTP request using the DNS response received at stage 230. The IDU 148 captures the URL from the HTTP request received from the browser 142. Using the captured URL, the IDU 148, at stage 234, sends an HTTP request to the enterprise 26. This request uses an IP address assigned by a RADIUS (remote authentication dial-in user service) server. It is assumed that this IP address is similar to the address used by the user 140 when having the problem about which the user 140 is now complaining. At stage 236, no HTTP response is received from the enterprise 26 or a reject message is received from a router in the ISP Net 22. The lack of an HTTP response or the receipt of a reject message can be due to, e.g., a time-out or a connection reset. Referring now to FIG. 10, at stage 238 the IDU 148 returns the test results to the expert link 146. At stage 240, the expert link 146 analyzes the test results received in stage 238. The expert link 146 determines that a firewall characterization test is needed and requests this test.

At stages 242, 244, and 246, the firewall characterization test determined to be needed in stage 240 is initiated. At stage 242 the expert link 146 informs the user link 144 about the new test. The user link 144, at stage 244, sends instructions to the browser 142 to inform the user 140 about the new test via a page 245. At stage 246, the expert link 146 launches the firewall characterization test, which the IDU 148 acknowledges.

Firewall testing is performed and analyzed at stages 248, 250, 252, 254, 256, 258, 260, and 262.

At stage 248 an Internet Control Message Protocol (ICMP) ping is sent out toward the ISP Net 22 and the enterprise 26. The IDU 148 sends the ICMP ping, a standard echo message as defined in RFC (Request For Comments) 792, to a destination machine and waits for an expected echo reply packet in response to the ICMP ping. If an echo reply is not received within a configurable timeout period, then the ICMP ping times out at stage 250. If the ICMP ping times out, then the destination machine may not be currently active or reachable. Alternatively, firewall machines in the path from the IDU 148 to the destination machine may be rejecting transmission of certain packets, including ICMP echoes and echo reply messages.

In response to the ICMP ping sent at stage 248 timing out at stage 250, the IDU 148 sends a Transmission Control Protocol (TCP) ping to ports such as TELNET, File Transfer Protocol, SMTP, HTTP ports at stage 252. The TCP ping is similar to the ICMP ping, but occurs at the transport layer of the network and helps address the issue of potential firewall filtering.

The TCP ping attempts to open a TCP connection to a specific TCP port on the destination machine using a standard procedure described in RFC 793. If the TCP connection is successfully opened, then the destination machine is active and reachable and the TCP ping closes the connection in a standard fashion. The TCP connection may be explicitly rejected, as indicated by a received error or reset packet that can come from the destination machine or a machine in the path from the IDU 148 to the destination machine. Also, the TCP ping can time out at stage 254 if no response is received within a configurable timeout period.

A TCP ping can be attempted to any TCP port. A TCP ping will not be stopped by a firewall that is filtering ICMP packets. If a firewall is filtering certain TCP packets, then trying TCP pings to many different ports can not only negate the effects of the firewall, but can also characterize the firewall.

At stage 256 the stages 248 and 252 are repeated using a "golden" IP address. A golden IP address is a predetermined IP address assigned to the IDU 148 and known to be valid. For example, the TCP ping can be sent to port 80, which corresponds to a server for HTTP. At stage 258 the enterprise 26 sends a TCP ping response to the IDU 148. The IDU 148 forwards, at stage 260, the results of the web access and/or firewall tests to the expert link 146. At stage 262 the expert link 146 analyzes the results from the tests. By analyzing the test results the expert link 146 comes to a conclusion as to the root cause of the user's symptom.

The isolated cause of the user's problem is relayed to the user 140, the session with the user closed, and remedial action initiated. At stage 264 the expert link 146 sends indications of the root cause to the user link 144 which forwards information regarding the fault and required action to the browser 142 at stage 266. The browser 142 provides information to the user 140, such as through a window 267 indicating that the problem is in the network and instructing the user 140 to log out of the network and reconnect. The user 140 is also informed that the user 140 will receive an Email when the problem has been resolved. At stage 268 the browser 142 acknowledges receipt of the indications of the fault isolation and required action. At stage 265 the expert link 146 instructs the IDU 148 to end the testing. At stage 270 the user link 144 instructs the expert link 146 to archive the results of the testing. At stage 272 the expert link 146 sends an Email to the NOC at the ISP Net 22 to initiate remedial action for the isolated problem. The NOC has the responsibility in the ISP Net 22 for maintaining the ISP's network. An example of the Email is "The following class C addresses are being denied access through Router/Gateway five.backbone.net. Probable filter problem with IP address 110.101.23.XXX."

Figure 11:
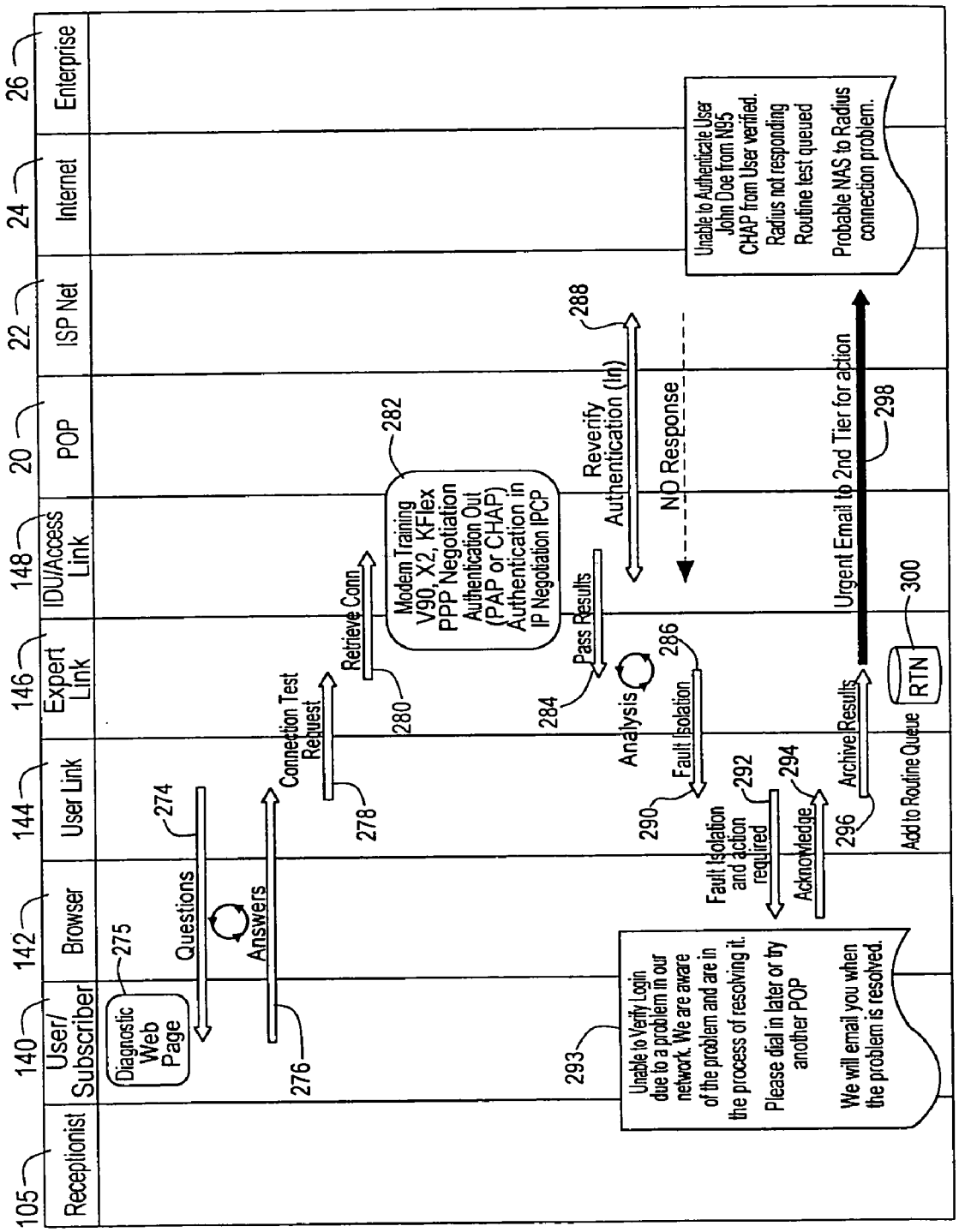
Figure 12:
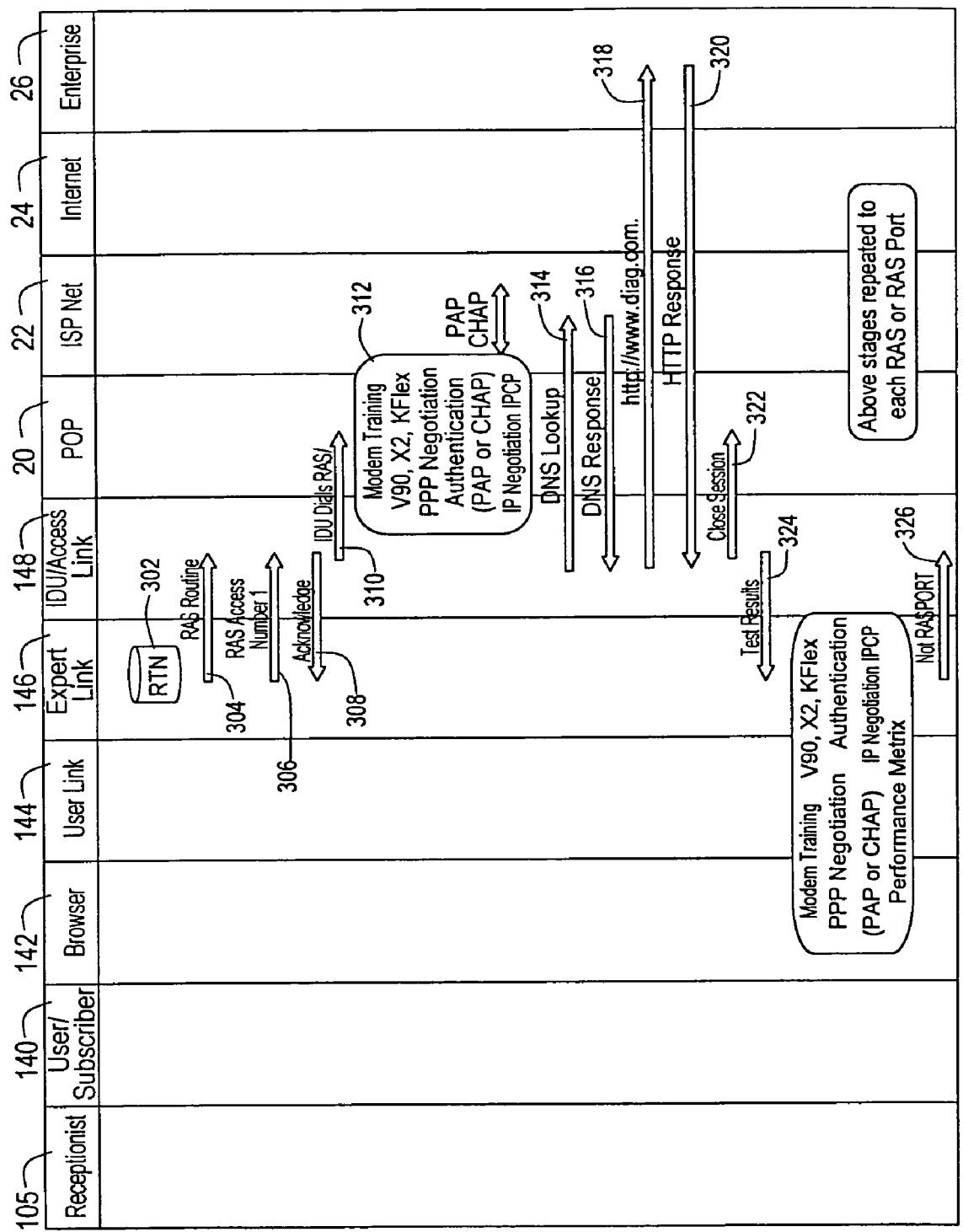

FIGS. 11-12 illustrate another example of isolating and reporting a fault, according to stages 132, 134, and 136 of FIG. 3, for an example of when the user 140 cannot properly connect to the network 10 (FIG. 1). In this example, the root cause or fault is that a NAS or RADIUS server is improperly configured (e.g., there is a bad shared secret, the NAS is not listed in a RADIUS access list, or the wrong RADIUS server is configured in the NAS). The illustrated session for isolating and reporting the fault is established as described above with respect to FIG. 4.

At stages 274, 276, and 278, a test is initiated to determine the cause of the user's connectivity symptoms. At stages 274 and 276 the user link 144 and user 140 interact via a diagnostic web page 275 by exchanging questions and answers to establish the user's symptom of not being able to connect (possibly intermittently). At stage 278, the user link 144 requests a connectivity test from the expert link 146.

The expert link 146 proceeds with the connectivity test to isolate the root cause of the user's symptom. At stage 280 the expert link 146 retrieves accumulated user dial-up session results from the IDU 148. At stage 282 modem training, protocol negotiations, and authentications are performed as described above with respect to stages 130*a* and 130*b* described with respect to FIG. 4. At stage 284 the IDU 148 passes the results of the connectivity test to the expert link 146. At stage 286 the expert link 146 analyzes the test results and determines that the likely cause of the user's 140 symptom is an intermittent one or isolated to single NAS. At stage 288 IDU 148 reverifies the authentication looking in to the ISP Net 22, with no response expected from the ISP Net 22 due to the connectivity problem.

The fault isolation is reported to the user 140 and archived for future use and reported for possible remedial action. At stage 290 the expert link 146 reports the determined fault to the user link 144, that reports the fault isolation and required action to the browser 142 at stage 292. For example, the user 140 can be informed by a page 293 that there is a network fault causing the user's connectivity symptoms and that the is being attended to. The information can also instruct the user to dial in later or to try another POP and that the user 140 will receive an Email when the cause of the problem is resolved. At stage 294 the browser 142 acknowledges receipt of the information indicating the isolated fault and required action. At stage 296 the results of the fault isolation are archived for future use. Email can be sent at stage 298 from the expert link 146 to the ISP Net 22, and specifically the NOC in the ISP Net 22, to initiate possible remedial action. An example of this Email is "Unable to Authenticate User John Doe from NAS. CHAP from user verified. RADIUS not responding, Routine test queued. Probable NAS to RADIUS connection problem." At stage 300, the expert link 146 adds a NAS routine test to a routing queue. A routine test includes one or more test requests managed as a group. Here, a routine connectivity test includes individual connectivity test requests for each possible NAS number that may cause the connectivity problem. A routing queue provides storage for a list of pending and active routine tests maintained in some order depending, e.g., on time or priority, for sequential execution. Some routine tests are (as at stage 300) queued as a result of an explicit problem-solving sequence. Other routine tests are queued periodically for proactive testing of network functionality and root cause analysis even if no symptom has been reported. When all test requests in a routine test have executed, the routine test is considered completed and is removed from the queue. The user 140 may be able to select whether to receive e-mail notification when the routine test completes and also to indicate whether the user 140 was satisfied with the session isolating the fault.

As shown in FIG. 12, a NAS testis performed. The appropriate test is selected from the routine queue at stage 302. At stage 304, the expert link 146 establishes a session with the IDU 148 for performing the routine connectivity test on a NAS. At stage 306 the expert link 146 requests a routine connectivity (dial-out) test for the selected NAS and the IDU 148 acknowledges, at stage 308, that resources are available for the requested routine test.

The IDU 148 dials the selected NAS at stage 310 to initiate the routine connectivity test for the selected NAS. At stage 312, modem training occurs between the IDU 148 and ISP Net 22 to establish the appropriate protocol for communication between the IDU 148 and ISP Net 22. Several exchanges also occur for PPP negotiation and analysis. Authentication and analysis, possibly using previously-captured information, is also performed. IPCP negotiation and analysis is also performed and an IP address/netmask is assigned. At stage 314 the IDU sends a DNS request to look up a standard host name, e.g., www.diag.com. At stage 316, the ISP Net 22 sends a DNS response to the IDU 148 corresponding to the DNS request received from the IDU 148. Using the received DNS response the IDU 148 sends, at stage 318, an HTTP request to the enterprise 26 to retrieve a standard diagnostic page. At stage 320 the enterprise 26 sends an HTTP response to the IDU 148. The IDU 148 closes the session with the NAS at stage 322 and reports the test results to the expert link 146 at stage 324. These results reported to the expert link 146 include, for example, metrics on performance of the NAS, the modem training PPP negotiation, authentication, and IPCP negotiation performed. At stage 326 the expert link 146 selects the next NAS or port to be tested for connectivity. The connectivity routine repeats for the newly selected NAS or port. For at least one of the NAS servers tested for connectivity the IDU 148 discovers, in this example, that the authentication and analysis using captured information fails. This information is reported back to the expert link 146 in stage 324. These results can be forwarded to the user 140 and/or any other entity for initiating appropriate remedial action.

The expert link 146 analyzes all the results from all the NAS tests and concludes that there is a RADIUS misconfiguration for a NAS. The expert link 146 sends a dispatch to the NOC in the ISP Net 22 to initiate remedial action. The expert link 146 sends notification to the user 140 and routining results are logged in a database for future use.

Figure 13:
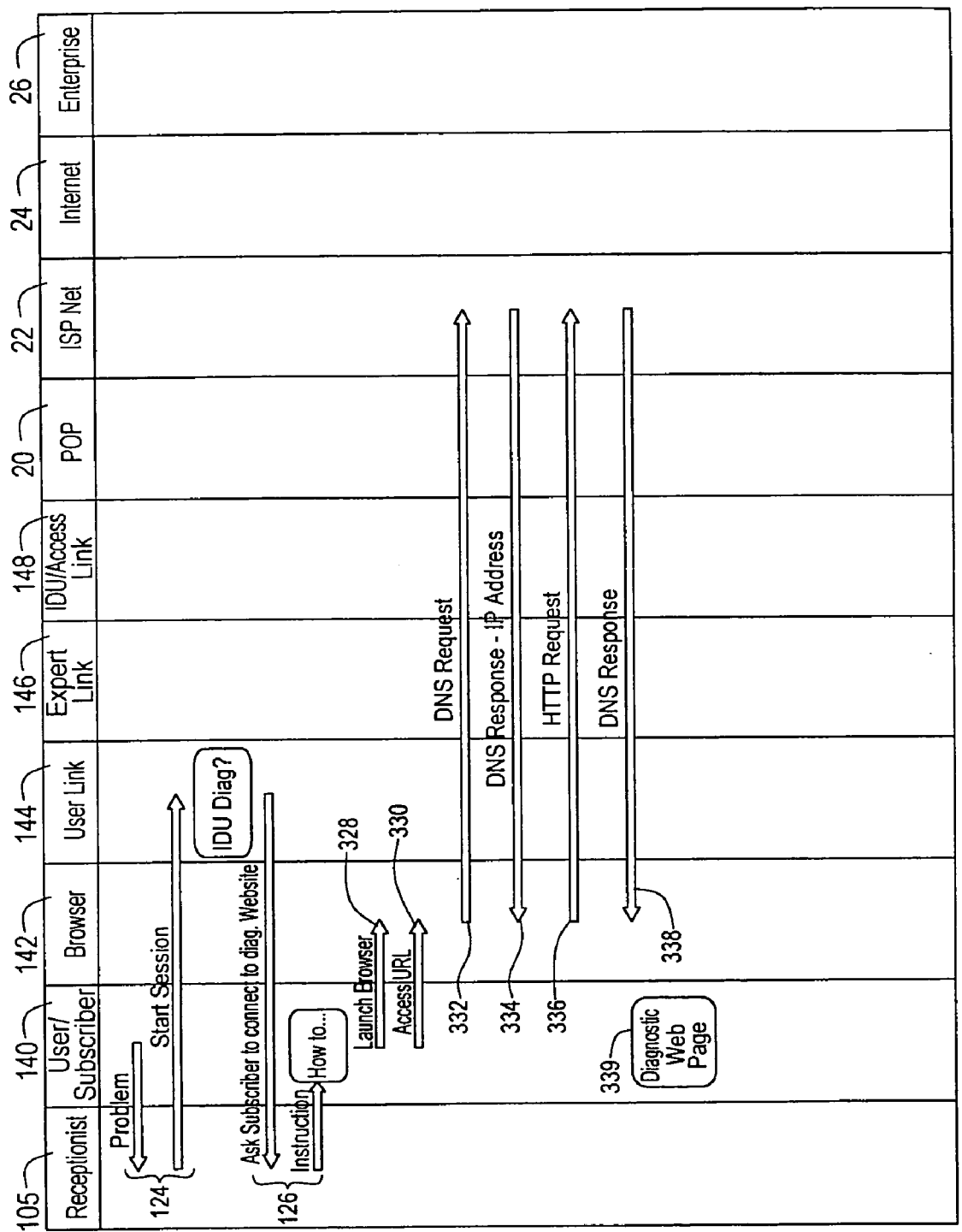
Figure 14:
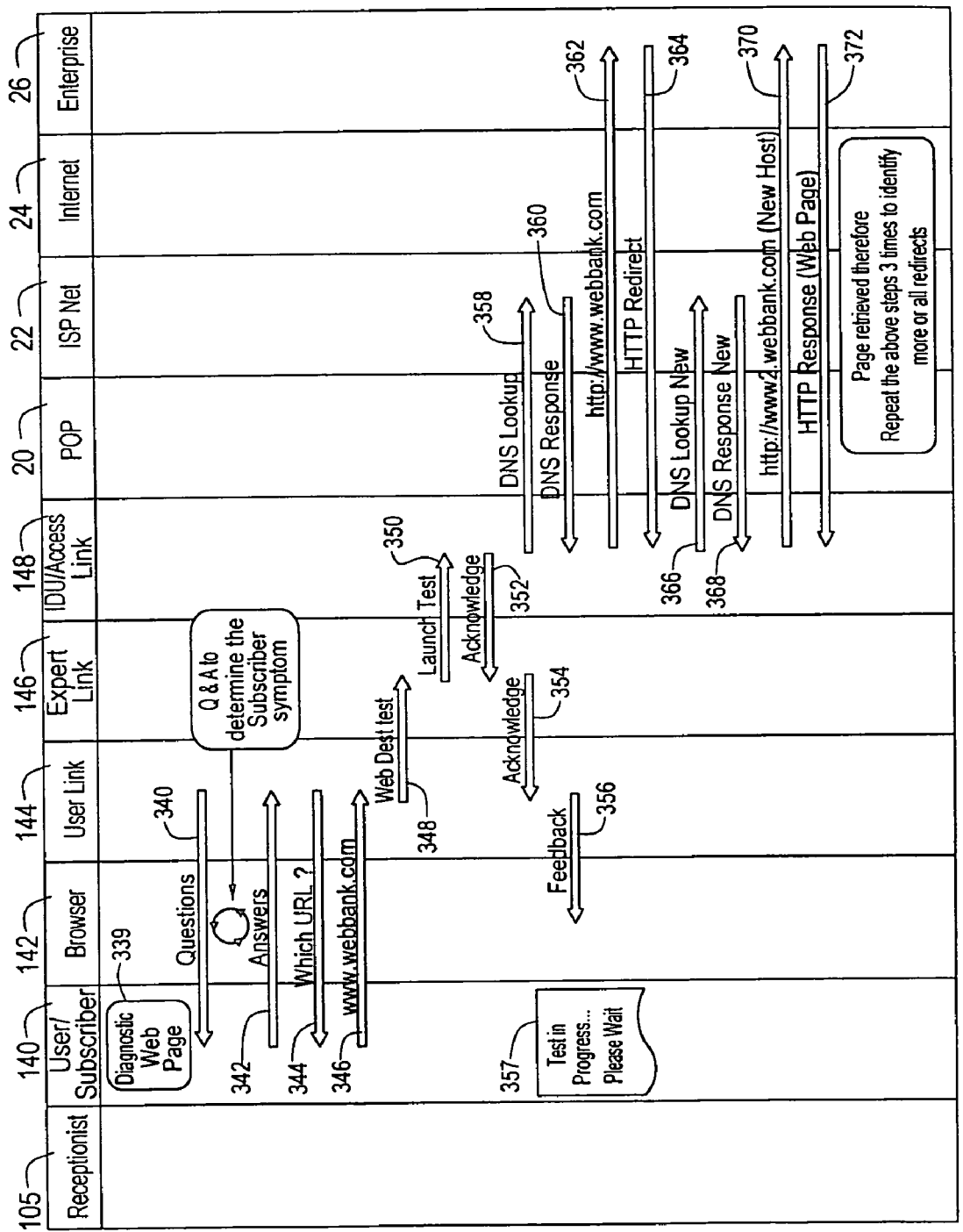
Figure 15:
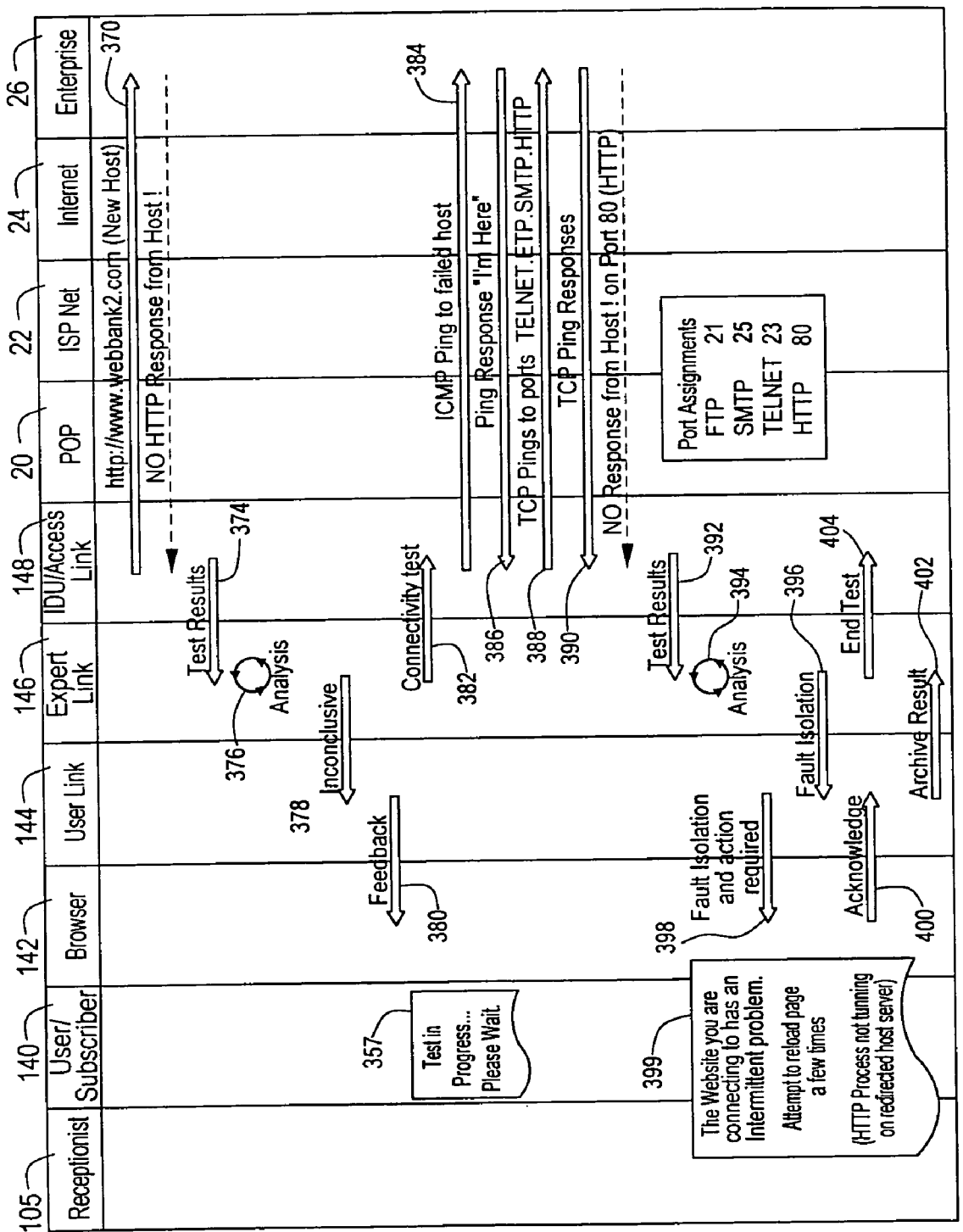

FIGS. 13-15 illustrate stages for resolving a user's problem accessing a particular URL (in this case www2.webbank.com) through the isolation of the cause of the problem and reporting and archiving of the isolation results. In this example, the user 140 cannot access a particular URL, possibly intermittently, and the root cause of this problem is that the web server is using redirection for load balancing and one of the load-balanced machines is not responding.

FIG. 13 illustrates stages for the beginning of a session to resolve a problem encountered by the user 140. Stage 124 and 126 of FIG. 13 are the same as the identically-numbered stages described above with respect to FIG. 4, except that in FIG. 13 the problem is the inability to accesses a particular URL. At stage 328 and 330 the user 140 launches the browser 142 and accesses a desired URL per instructions by the receptionist 105, respectively, as described above with respect to stages 130c and 130d (FIG. 4). At stage 332 the browser 142 sends a DNS request to the ISP Net 22 that responds at stage 334 with an IP address sent to the browser 142. At stage 336 the browser 142 sends an HTTP request to the ISP Net 22 and receives a corresponding HTTP response from the ISP Net 22 at stage 338. The user is presented with a diagnostic web page 339, prompting the user to supply information describing the user's problem.

Referring to FIG. 14, a web test is initiated for isolating the root cause of the users problem accessing a particular URL. At stage 340 and stage 342 the user 140 and the user link 144 interact to describe the problem that the user 140 is encountering. In this example, the user 140 indicates that there is a web problem accessing a particular URL. At stage 344 the user link 144 queries the user 140 via the diagnostic web page 339 as to which URL is presenting a problem and the user 140 supplies the URL, in this case www2.webbank.com, at stage 346 via the diagnostic web page 339. At stage 348 the user link 144 requests a web test from the expert link 146.

In response to receiving the request for a web test from the user link 144, the expert link 146 initiates a web test. At stage 350 the expert link 146 communicates with the IDU 148 to launch the web test. The IDU 148 acknowledges, at stage 352, the request for the web test. The expert link 146 forwards the acknowledgement from the IDU 148 to the user link 144 at stage 354. At stage 356 the user link 144 forwards the information regarding the web test to the browser 142 to inform the user 140 that a test is in progress via a page 357.

The IDU 148 coordinates the execution of the web test. At stage 358 the IDU 148 sends a DNS request to the ISP Net 22 that responds at stage 360 with a DNS response. In this example, the DNS response indicates that the DNS request sent in stage 358 was an acceptable DNS request. At stage 362 the IDU 148 sends an HTTP request identical to the request sent by the user 140 with which the user 140 had the problem whose cause is now being isolated. This request is sent to the enterprise 26 and the enterprise 26 responds by sending an HTTP redirect to the IDU 148 at stage 364. At stage 366 the IDU 148 sends another DNS request to the ISP Net 22. The ISP Net 22 responds at stage 368 by sending a DNS response to the IDU 148. The DNS request sent in stage 366 and responded to in stage 368 correspond to the server name in the HTTP redirect received by the IDU 148 in stage 364. At stage 370 the IDU 148 sends an HTTP request to the redirect machine corresponding to the HTTP redirect response received in stage 364. In this example, the DNS of the redirect machine is www2.webbank.com. At stage 372 the IDU 148 receives an HTTP response, an actual web page, from the enterprise 26. Stages 362, 364, 366, 368, 370 and 372 are repeated to identify more if not all possible redirects for the URL producing the problem for the user 140. For example, these stages may be repeated until a maximum count is exceeded, or the same redirect URL is seen a predetermined number of times, or the stages are repeated some number of, e.g. three, times. Referring to FIG. 15, eventually the request sent at stage 370 will result in a timing out of the TCP connection such that there is no HTTP response from the host at the enterprise 28. At stage 374 the test results of the web test are sent from the IDU 148 to the expert link 146 for analysis at stage 376. In this example, the expert link 146 concludes from the analysis at stage 376 that the root cause of the user's problem is unclear and that the IDU 148 should perform a connectivity test. At stage 378 the expert link 146 sends the conclusion from stage 376 to the user link 144 that in turn transmits this information to the browser 142 at stage 380. The browser 142 can then inform or continue to inform the user 140 that testing is in progress via page 357.

The expert link 146 initiates the connectivity test that the expert link 146 determined, at stage 376, should be performed. At stage 382 the expert link 146 instructs the IDU 148 to launch the connectivity test. The IDU 148 acknowledges the connectivity test requested by the expert link 146 and at stage 384 sends an ICMP ping to the failed redirect host. At stage 386 the enterprise 26 sends to the IDU 148 a ping response indicating that the direct host is present. The IDU 148 receives the ping response and at stage 388 sends several TCP pings to several common ports (e.g., TELNET, Fault-Tolerant Protocol, SMTP, HTTP). At stage 390 the enterprise 26 sends a TCP ping response to the IDU 148. The TCP ping response is an actual response for some ports, refusals for others, and nothing for the HTTP port. Commonly-used port assignments are 21 for Fault-Tolerant Protocol stack, 25 for SMTP, 23 for TELNET, and 80 for HTTP. At stage 392 the results of the connectivity test are conveyed from the IDU 148 to the expert link 146 for analysis at stage 394. The expert link 146 analyzes the test results and conveys the conclusions of the analysis to the user link 144 at stage 396. At stage 398 the user link 144 forwards information regarding the fault isolation and any action required to the browser 142. The browser 142 supplies information to the user 140 regarding the fault isolation and the required action. For example, a window or page 399 can be displayed to the user 140 indicating that the web site that the user 140 is attempting to connect to has an intermittent problem and instructing the user 140 to attempt to reload the desired page a few times. The information supplied to the user 140 can also indicate that the HTTP process is not running on a redirected host server. The browser 142 acknowledges receipt of the fault isolation and required action information at stage 400. At stage 402 the user link 144 sends the results of the above stages to the expert link 146 for archiving. At stage 404 the expert link communicates with the IDU 148 to end the fault isolation testing. In this example, the root cause is outside of the ISP Net 22 and therefore no service request is transmitted by the IDU 148. Such a remedial action request could be sent by the IDU 148 if desired, for example if the entity that would perform the remedial action were under common control with the IDU 148.

Figure 16:
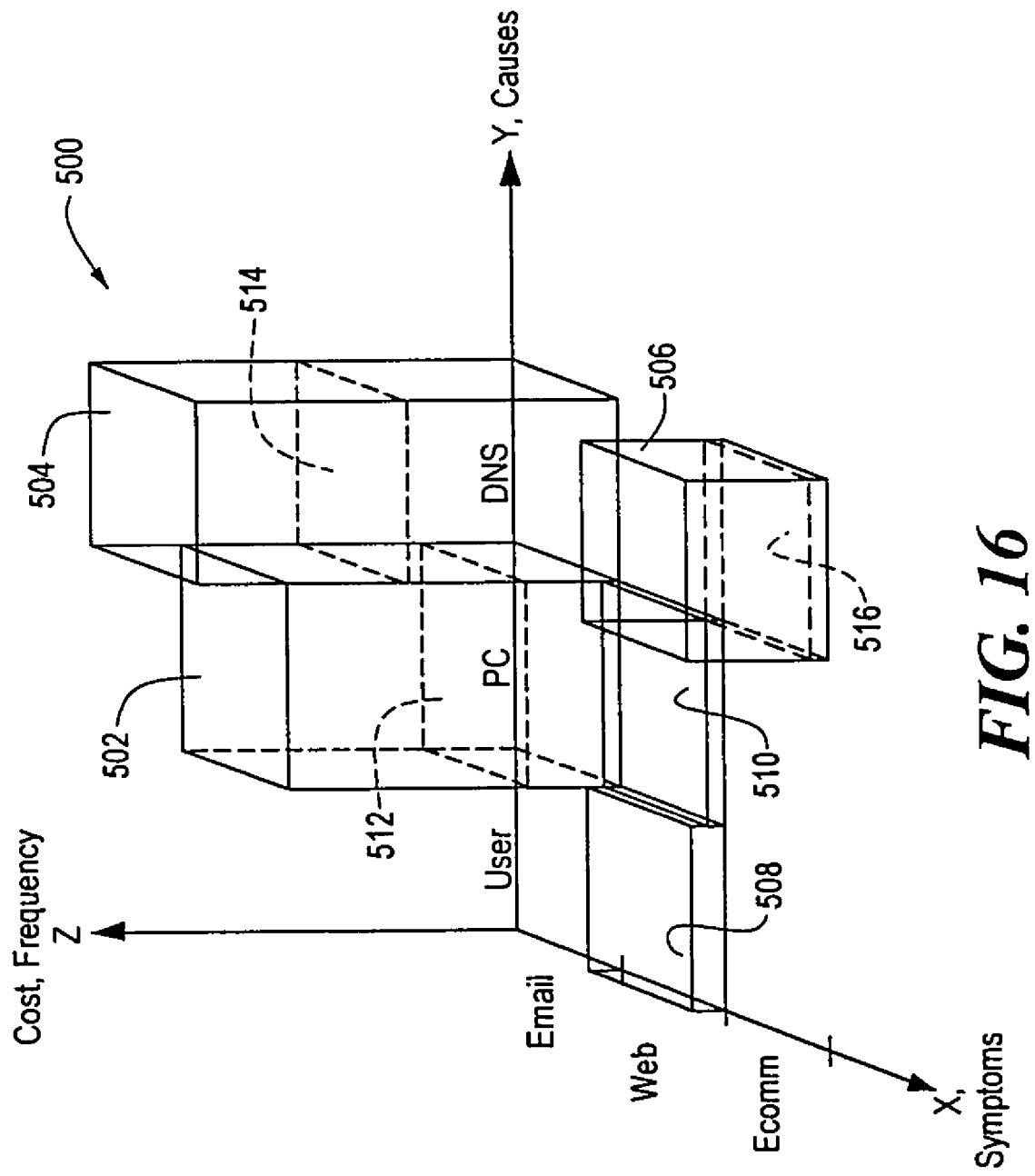
FIG. 16 is a three-dimensional bar chart of combinations of network symptoms and causes thereof.

FIG. 16 shows a graphical representation of a correlation between problems/symptoms and causes of the symptoms. Data stored from interactions between the user 140 (FIG. 4) and the IDU 148 (FIG. 4), and results of tests archived by the expert link 146 (FIG. 4), or similar data that are obtained in some other fashion, can be compiled into the graph 500 shown. As shown, symptoms are plotted along the "x" axis of the graph 500, causes of problems/symptoms (faults) are plotted along the "y" axis, and costs associated with combinations of symptoms and causes are plotted on the "z" axis.

The symptoms chosen can vary and can depend on the type of network, the types of symptoms common in the network, and/or the symptoms of concern to the entity producing the graph 500. Exemplary symptoms as shown are Email, web, and Ecommerce (Ecomm). Other possible symptoms include cannot send Email, cannot receive Email, access too slow, cannot connect, cannot connect to web site, repeated disconnections, and cannot run browser.

The choice of plotted causes can depend on a variety of factors. For example, the chosen causes can depend on the type of network and equipment used therein, what causes are most frequently diagnosed, causes costing the most to repair/fix, and/or the causes of concern to the entity plotting the graph 500 (i.e., causes for which the plotting entity has responsibility/control to fix). Exemplary causes shown are user, PC, and DNS. Other possible causes include PC configuration, modem, no isolation (between local loop, exchange, and trunk), NAS, ISP router, ISP server (DNS, RADIUS, DHCP, Email), internet router, and internet server.

The cost of combinations of symptoms and causes can include more than just the cost of the repair for parts and labor. For example, this cost can include incidental costs such as a cost assigned to downtime, which can cause lost business, and customer frustration which could lead to loss of customers. Costs can be estimated for how much potential business is lost due to downtime and frequency of faults. These costs can thus be due, e.g., to large parts and labor repair costs, high incidental costs, and/or high frequency of faults even if the individual repair and/or associated incidental costs are low.

At each intersection of a symptom and a cause there is an indication of the cost of the combination, here a vertical bar of a height proportional to this cost. These vertical bars give the graph 500 the appearance of densely-packed skyscrapers. Thus, the graph 500 is referred to as a "Manhattan Chart." The graph 500 need not, however, use vertical bars. Other indications, such as vertical lines or points displaced vertically, can be used in addition to non-three-dimensional indications such as colors, numbers located at the intersections of the symptoms and causes in the "x-y" plane.

By plotting the graph 500, combinations of causes and symptoms costing relatively large amounts can be easily identified and targeted for improvement. For example, bar 502 represents the cost of Email problems resulting from PC faults. Bar 504 indicates the cost of Email problems due to DNS faults. Bar 506 indicates the cost of Ecommerce symptoms due to DNS problems. Bars 508 and 510 represent the costs of web symptoms resulting from user and PC faults, respectively. From the Manhattan Chart 500, it can be seen that bars 502, 504, and 506 indicate relatively high costs relative to the other bars. Thus, the graph 500 suggests that targeting DNS failures relative to Email and Ecommerce problems, and PC faults relative to Email problems, should be of higher priority than user and PC faults related to web problems. Costs can be reduced by, e.g., reducing the repair cost per fix, reducing the frequency that the fault occurs, and/or reducing the time to fix the fault (which affects both repair cost and incidental costs).

After targeting these high-cost cause/symptom combinations in order to reduce the cost of the combination, the graph 500 can be replotted as indicated by the dashed bars 512, 514, and 516. The bars 512, 514, and 516 indicate that the cost of the Email-PC, Email-DNS, and Ecomm-DNS combinations have all decreased. By comparing the graph 500 with plots of the indicated symptom-cause combinations before and after targeted improvement, the reduction in network problems and costs can be readily appreciated.

Other embodiments are within the scope of the appended claims. For example, the IDUs 94 and 96 were described in terms of software instructions for hardware to perform operations. Due to the nature of software, the functionality of the software could be accomplished using hardware, firmware, hard wiring, or combination of these. Also, analysis functions performed by the central controller 98 could be performed in one or more of the IDUs 94 or 96. Also, the network 10 shown in FIG. 1 including the local loop 14 is illustrative only and not limiting. Different networks are within the scope of the invention and the appended claims, including networks such as cable TV networks, that do not include a local loop. For example, the local loop 14 in FIG. 1 can be replaced by a Hybrid Fiber Coax (HFC) system, or a wireless system. Additionally, FIG. 2 shows the network connections 100 and 102 operatively connecting the IDUs 94 and 96 to the central controller 98 as lines. The IDUs 94 and 96, however, can be operatively connected to the controller 98 in a variety of ways such as with wires, fiberoptic cables, or wireless devices.

What is claimed is:

1. A method of diagnosing a problem in a network impacting communication between a network user and a destination machine in the data network comprising:

establishing communication between a diagnostic unit and the network user using a protocol stack adapted to establish communication with the network user even if the network user is attempting to communicate using a protocol or configuration that is inconsistent with a protocol or configuration of the destination machine;

simulating, with said diagnostic unit, the destination machine to said network user by receiving first data from the network user, generating second data simulating a response of the destination machine to the first data and sending the second data to the network user;

determining with said diagnostic unit the presence of a problem with said network user based at least in part on information gathered during the act of simulating; and if a problem is determined, storing an indicator of the problem on a computer-readable medium, wherein said diagnostic unit is located remotely to said network user and said destination machine.

2. The method of claim 1 wherein determining the presence of a problem with said network user includes determining a problem while there is a problem impacting communication between the diagnostic unit and the destination machine.

3. The method of claim 1 wherein establishing communication between a diagnostic unit and the network user includes establishing communication while the network user is misconfigured for communication through the network.

4. The method of claim 1 wherein emulating further comprises acquiring a user identification of said network user.

5. The method of claim 1 further comprising introducing test data to said network user.

6. The method of claim 4 wherein acquiring a user identification includes authenticating a password of said network user.

7. The method of claim 5 further comprising monitoring the results of said test data introduced to said network user.

8. A method of diagnosing a problem in a network impacting communication between a network user and a destination machine in the data network comprising:
   establishing communication between a diagnostic unit and the destination machine protocol, and between said diagnostic unit and said network user;
   simulating, with said diagnostic unit, said network user to said destination machine by generating first data simulating the network user, sending the first data to the destination machine and receiving second data from the destination machine;
   determining with said diagnostic unit the presence of a problem within said data network based at least in part on information gathered during the act of simulating; and
   if a problem is determined, communicating an indicator of the problem,
   wherein said diagnostic unit is located remotely to said network user and said destination machine.

9. The method of claim 8 wherein said determining the presence of a problem within said data network is determined includes determining the presence of a problem within said data network despite the presence of problem impacting communication with the network user.

10. The method of claim 8 wherein determining the presence of a problem within said data network is performed while the network user is misconfigured for communication through the network.

11. The method of claim 8 wherein emulating further comprises said diagnostic unit providing a user identification for said network user.

12. The method of claim 8 further comprising said diagnostic unit injecting test data into said data network.

13. The method of claim 11 wherein acquiring a user identification includes providing a password for said network user.

14. The method of claim 12 further comprising monitoring with said diagnostic unit the results of said test data injected into said data network.

15. The method of claim 1 wherein establishing communication between a diagnostic unit and a network user includes the network user calling a help desk maintained by the network operator.

16. A method of diagnosing a problem in a network impacting communication between a network user and a destination machine in the data network comprising:
   a) checking for the presence of a problem with a user device by:
      i) establishing communication between a diagnostic unit and the user device;
      ii) simulating, with said diagnostic unit, the destination machine to said user device by receiving first data from the user device, generating second data simulating a response of the destination machine to the first data, and sending the second data to the network user;
      iii) using the diagnostic unit to observe communications from the user device during the act of simulating the destination machine;
      iv) using the communications from the user device to determine whether there is a problem with the network in a portion of the network from the diagnostic unit toward the user device; and
      v) if a problem is determined, communicating an indicator of the problem;
   b) checking for a problem with the network excluding the user device by:
      i) establishing communication between a diagnostic unit and the destination machine;
      ii) simulating, with said diagnostic unit, said user device to said destination machine by generating third data simulating the user device, sending the third data to the destination machine and receiving fourth data from the destination machine;
      iii) using the diagnostic unit to observe communications from the destination machine during the act of simulating said user device;
      iv) using the communications from the destination machine to determine whether there is a problem with said data network, in a portion of the network from the diagnostic unit toward the destination machine; and
      v) if a problem is determined, storing an indicator of the problem on a computer-readable medium,
   wherein said diagnostic unit is located remotely to said network user and said destination machine.

17. The method of claim 16 wherein establishing communication between a diagnostic unit and the user devices includes the user calling a help desk operated by the network service provider.

18. The method of claim 16 wherein establishing communication between a diagnostic unit and the user devices includes negotiating a link control protocol between the diagnostic unit and a user device.

19. The method of claim 16 wherein establishing communication between a diagnostic unit and the user devices includes providing a diagnostic unit that can respond to a user device configured for static IP addressing or dynamic IP addressing.

20. The method of claim 19 wherein determining whether there is a problem with said network user devices includes detecting a misconfigured user device based on the type of IP addressing used to establish communication between the diagnostic unit and the user device.

* * * * *